(12) United States Patent
Watanabe et al.

(10) Patent No.: US 10,346,075 B2
(45) Date of Patent: Jul. 9, 2019

(54) DISTRIBUTED STORAGE SYSTEM AND CONTROL METHOD FOR DISTRIBUTED STORAGE SYSTEM

(71) Applicant: Hitachi, Ltd., Tokyo (JP)

(72) Inventors: Yasuo Watanabe, Tokyo (JP); Hiroaki Akutsu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/553,174

(22) PCT Filed: Mar. 16, 2015

(86) PCT No.: PCT/JP2015/057615
§ 371 (c)(1),
(2) Date: Aug. 24, 2017

(87) PCT Pub. No.: WO2016/147281
PCT Pub. Date: Sep. 22, 2016

(65) Prior Publication Data
US 2018/0074746 A1   Mar. 15, 2018

(51) Int. Cl.
*G06F 3/06* (2006.01)
*G06F 12/10* (2016.01)

(52) U.S. Cl.
CPC .............. *G06F 3/0641* (2013.01); *G06F 3/06* (2013.01); *G06F 3/061* (2013.01); *G06F 3/067* (2013.01);
(Continued)

(58) Field of Classification Search
CPC ..... G06F 3/0641; G06F 3/0608; G06F 3/0665
See application file for complete search history.

(56) References Cited

U.S. PATENT DOCUMENTS 8,572,137 B2    10/2013  Fienblit et al.
8,898,120 B1 *  11/2014  Efstathopoulos ... G06F 17/3007
                                                          707/692
(Continued)

FOREIGN PATENT DOCUMENTS

| JP | 2010277289 | 12/2010 |
| JP | 2015503174 | 1/2015 |
| WO | 2013038510 | 3/2013 |

OTHER PUBLICATIONS

International Search Report for PCT/JP2015/057615 dated May 19, 2015.

*Primary Examiner* — Edward J Dudek, Jr.
(74) *Attorney, Agent, or Firm* — Mattingly & Malur, PC

(57) ABSTRACT

Regarding a distributed storage system including a plurality of nodes, a first node among the plurality of nodes judges whether the same data as first data, which is written to a first virtual partial area managed by the first node from among a plurality of virtual partial areas, exists in the virtual partial area managed by another node among the plurality of nodes; when the same data as the first data exists in the other node, the first node executes inter-node deduplication for changing allocation of either one of logical partial areas for the first virtual partial area or the virtual partial area of the other node to which the same data is written, to the other logical partial area; and when I/O load on the first node after execution of the inter-node deduplication of the first virtual partial area and the predicted value is less than a first threshold, the first node executes the inter-node deduplication of a second virtual partial area managed by the first node from among the plurality of virtual partial areas obtained by dividing the virtual storage area.

13 Claims, 16 Drawing Sheets

(52) U.S. Cl.
CPC .......... *G06F 3/0608* (2013.01); *G06F 3/0665* (2013.01); *G06F 12/10* (2013.01); *G06F 2212/1044* (2013.01); *G06F 2212/152* (2013.01); *G06F 2212/154* (2013.01)

(56) References Cited

U.S. PATENT DOCUMENTS

| | | |
|---|---|---|
| 10,037,337 B1* | 7/2018 | Shanmuganathan ........................ G06F 17/30159 |
| 2010/0306495 A1 | 12/2010 | Kumano et al. |
| 2013/0145092 A1 | 6/2013 | Miwa et al. |
| 2014/0046998 A1* | 2/2014 | Dain ..................... G06F 9/5061 709/201 |
| 2014/0201169 A1 | 7/2014 | Liu et al. |
| 2015/0213049 A1* | 7/2015 | Kleiman ........... G06F 17/30159 707/692 |
| 2016/0019232 A1* | 1/2016 | Lambright ........ G06F 17/30159 707/692 |
| 2017/0109364 A1* | 4/2017 | Hasegawa ......... G06F 17/30097 |

* cited by examiner

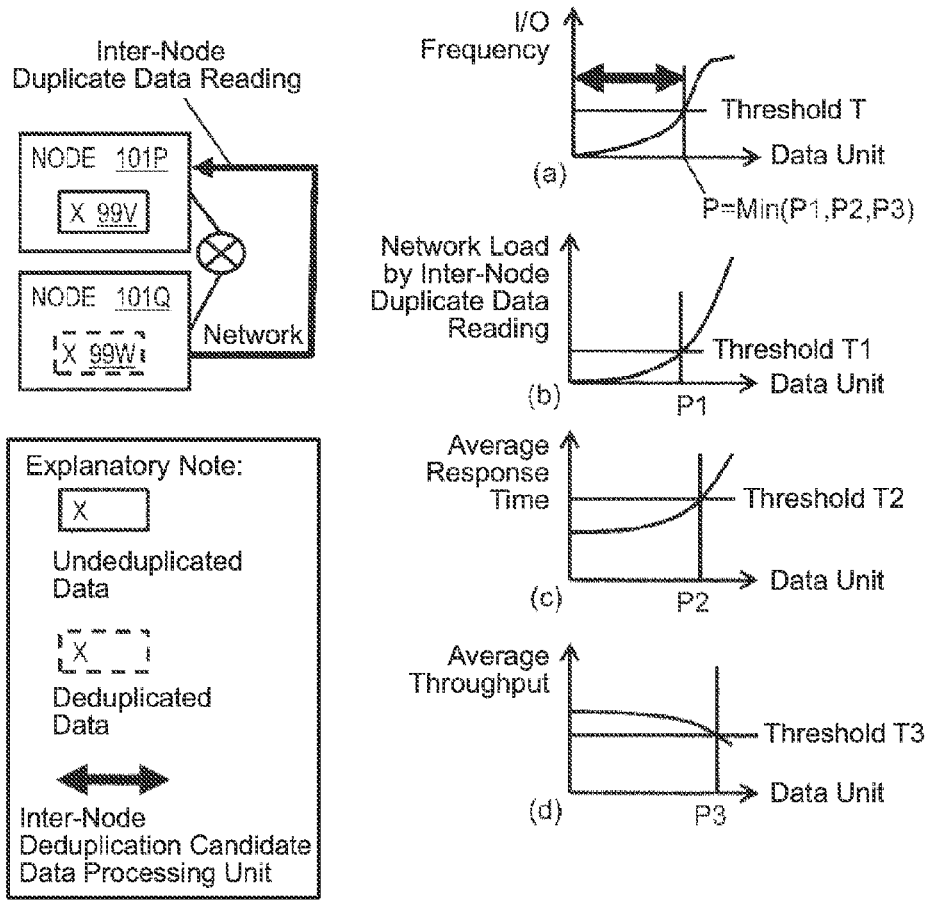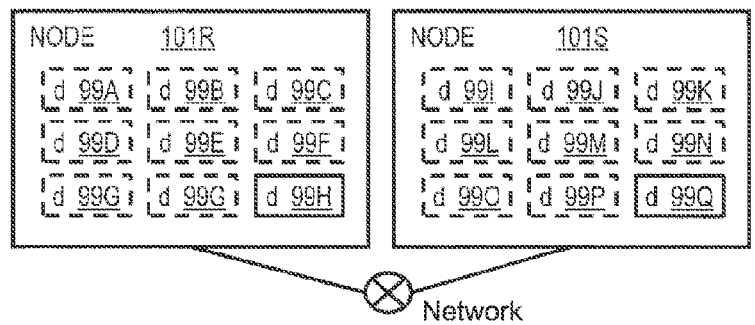
Fig.1

| Virtual Volume Management Table 218 | | |
|---|---|---|
| VIRTUAL VOLUME# | SIZE (BLOCK) | USE NODE# |
| 0x0100 | 0x21210000 | 0x00, 0x01, 0x02 |
| 0x0101 | 0x12301200 | 0x00 |
| 0x1100 | 0x42123000 | 0x00, 0x01, 0x02 |
| 0x2100 | 0x12124120 | 0x00, 0x02 |
| 0x3100 | 0x12181230 | 0x00, 0x03, 0x04 |

Fig.4A

| Pool Volume Management Table 219 | | |
|---|---|---|
| POOL VOLUME# | SIZE (BLOCK) | NODE# |
| 0x0000 | 0x21210000 | 0x00 |
| 0x0001 | 0x12301200 | 0x00 |
| 0x1000 | 0x42123000 | 0x01 |
| 0x2000 | 0x12124120 | 0x02 |
| 0x3000 | 0x12181230 | 0x03 |

Fig.4B

| Drive Management Table 220 | | | |
|---|---|---|---|
| POOL VOLUME# | TYPE | DRIVE# | SIZE (BLOCK) |
| 0x0000 | SSD | 0x40 | 0x20000000 |
| | | 0x41 | 0x20000000 |
| | | 0x42 | 0x20000000 |
| 0x0001 | NL-SAS (7.2Krpm) | 0x20 | 0xE0000000 |
| | | 0x21 | 0xE0000000 |
| | | 0x22 | 0xE0000000 |

Fig.4C

| Page Mapping Table 215 | | | |
|---|---|---|---|
| VIRTUAL VOLUME# | LBA | RANGE | NODE # |
| 0x0000 | | | |
| | | | |
| | | | |
| 0x0001 | | | |
| | | | |

Fig.5A

| Page Load Frequency Table 216 | | | | | |
|---|---|---|---|---|---|
| VIRTUAL VOLUME# | LBA | RANGE | IO FREQUENCY | INTER-NODE DUPLICATE DATA READ FREQUENCY | RE-SPONSE TIME |
| 0x0000 | | | | | |
| | | | | | |
| | | | | | |
| 0x0001 | | | | | |
| | | | | | |

Fig.5B

| Virtual Chunk Load Frequency Table 225 | | | | | |
|---|---|---|---|---|---|
| VIRTUAL VOLUME# | LBA | RANGE | IO FREQUENCY | INTER-NODE DUPLICATE DATA READ FREQUENCY | RE-SPONSE TIME |
| 0x0000 | | | | | |
| | | | | | |
| | | | | | |
| 0x0001 | | | | | |
| | | | | | |

Fig.6A

| Logical Chunk Load Frequency Table 226 | | | |
|---|---|---|---|
| POOL VOLUME# | LBA | RANGE | IO FREQUENCY |
| 0x0000 | | | |
| | | | |
| 0x0001 | | | |
| | | | |

Fig.6B

| Fingerprint Table (FPT) 231 | | | |
|---|---|---|---|
| FP | VIRTUAL VOLUME# | LBA | RANGE |
| | | | |
| | | | |
| | | | |

Fig.7A

| FPT Update Log 239 | | | | |
|---|---|---|---|---|
| FP | VIRTUAL VOLUME# | LBA | RANGE | OPERATION |
| | | | | |
| | | | | |

Fig.7B

Deduplication Effect Management Table 232

| NODE# | FP | THE NUMBER OF NODE DEDUPLICATION REDUCTIONS | THE NUMBER OF SITE DEDUPLICATION REDUCTIONS | THE NUMBER OF GEO-DEDUPLICATION REDUCTIONS |
|---|---|---|---|---|
| 0 | A | 10 | 0 | 0 |
|  | B | 20 | 5 | 0 |
|  | C | 0 | 1 | 0 |
|  | D | 0 | 0 | 0 |
|  | : | : | : | : |
| : | : | : | : | : |

Fig.7C

Deduplication Log Structurization Mapping Table 233

Deduplication Mapping Table 234

VIRTUAL VOLUME # → LBA → POOL VOLUME# LBA/LEN | STATE | FP
0 → 0 → 0,0x0003,8 | STATE | FP

Deduplication Inverse Mapping Table 235

POOL VOLUME 1303
- DATA | TABLE
- DATA | TABLE
- DATA | TABLE
250   251

TABLE INDEX NO: 1
UPDATE TIME : 2014/5/14 16:32
REFERENCE

| INDEX | VIRTUAL VOLUME# | LBA | SIZE |
|---|---|---|---|
| 0 | 0 | 0 | 8 |

DISTRIBUTED STORAGE SYSTEM AND CONTROL METHOD FOR DISTRIBUTED STORAGE SYSTEM

TECHNICAL FIELD

The present invention relates to a distributed storage system.

BACKGROUND ART

A data amount that should be dealt with IT systems has been rapidly increasing and there has been a demand for storage apparatuses capable of dealing with such rapid increase in the data amount. As an example of such storage apparatuses, there is a technique of a distributed storage system that processes and stores data by distributing the data to a plurality of storage apparatuses. Concerning systems for which high-performance analysis is required for the purpose of, for example, analysis of large-scaled big data, the distributed storage system capable of providing scalable capacity and performance is believed to be an effective solution.

Meanwhile, there is a deduplication technique as a technique to save storage areas of storage apparatuses in order to deal with the rapidly increasing data amount. There is PTL 1 as a technique related to a distributed storage system and deduplication. Regarding PTL 1, when each of distributed servers constituting a distributed network receives a read request from a client to read data stored in another distributed server, it acquires the data from the other server and responds to the client. Moreover, a deduplication management apparatus manages a database of unique IDs for identifying the data such as hash values assigned to the data stored in each distributed server. When the deduplication management apparatus searches the database and finds that there are pieces of data associated with the same unique ID as many as or more than a threshold value, it selects a distributed server from which the data should be deleted, and deletes duplicate data stored in the selected distributed server, thereby performing deduplication.

CITATION LIST

Patent Literature

PTL 1: U.S. Pat. No. 8,572,137

SUMMARY OF THE INVENTION

Problems to be Solved by the Invention

When the deduplication is performed between the distributed servers and if the distributed server from which data has been deleted by means of the deduplication receives a read request to read the deleted data, that distributed server has to acquire the data from another distributed server, which results in a problem of performance degradation of the distributed server. Regarding PTL 1, only the number of pieces redundant data is used to judge the possibility of deduplication and no consideration is paid to the performance degradation caused by the occurrence of data communications between the distributed servers.

Means to Solve the Problems

A distributed storage system includes a plurality of nodes connected to each other for controlling storage of data in logical storage areas, each of which is composed of a storage medium. The plurality of nodes: provide a host system with a virtual storage area across the logical storage areas controlled by the respective nodes; manage allocation of a plurality of virtual partial areas obtained by dividing the virtual storage area and a plurality of partial logical storage areas obtained by dividing the logical storage area; and distribute data written to the virtual storage area and store the data in the logical storage areas. A first node among the plurality of nodes judges whether the same data as first data, which is written to a first virtual partial area managed by the first node from among the plurality of virtual partial areas, exists in the virtual partial area managed by another node among the plurality of nodes. When the same data as the first data exists in the other node, the first node executes inter-node deduplication for changing allocation of either one of logical partial areas for the first virtual partial area or the virtual partial area of the other node to which the same data is written, to the other logical partial area. When I/O load on the first node after execution of the inter-node deduplication of the first virtual partial area and the predicted value is lower than a first threshold, the first node executes the inter-node deduplication of a second virtual partial area managed by the first node from among the plurality of virtual partial areas obtained by dividing the virtual storage area.

Advantageous Effects of the Invention

When the deduplication is implemented by a distributed storage system with a plurality of nodes connected via a network according to an aspect of the present invention, both high data amount reduction effect and high performance can be achieved.

BRIEF DESCRIPTION OF DRAWINGS

FIG. 1 illustrates the outlines of judgment methods for executing inter-node deduplication;

FIG. 4A illustrates a structure example of a virtual volume management table:

FIG. 4B illustrates a structure example of a pool volume management table;

FIG. 4C illustrates a structure example of a drive management table;

FIG. 5A illustrates a structure example of a page mapping table;

FIG. 5B illustrates a structure example of a page load frequency table;

FIG. 6A illustrates a structure example of a virtual chunk load frequency table;

FIG. 6B illustrates a structure example of a logical chunk load frequency table;

FIG. 7A illustrates a structure example of a Fingerprint Table (FPT);

FIG. 7B illustrates a structure example of an FPT update log;

FIG. 7C illustrates a structure example of a deduplication effect management table;

FIG. 8 illustrates a structure example of a deduplication log structure mapping table;

DESCRIPTION OF EMBODIMENTS

Figure 2:
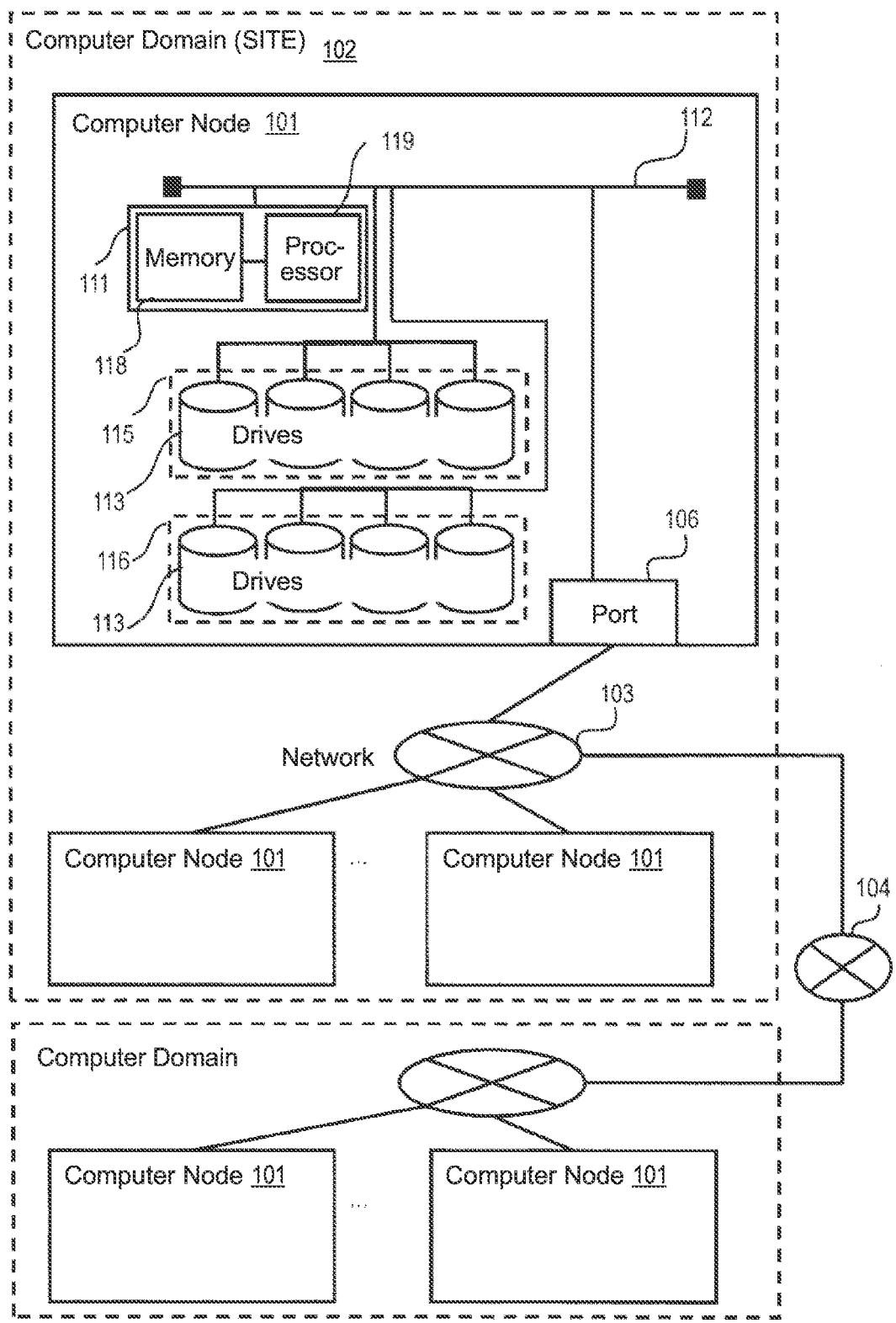
FIG. 2 illustrates a system configuration example of a distributed storage system.

Embodiments of the present invention will be explained below with reference to the drawings. Incidentally, embodiments described below are not intended to limit the invention according to the scope of claims and all combinations of features explained in the embodiments are not necessarily requisite to the means for solving the problems according to the invention.

In the following description, various kinds of information may sometimes be explained by using expressions such as a "table(s)," a "list(s)," and a "queue(s)"; however, the various kinds of information may be expressed with a data structure other than the data structures mentioned above. The expression "XX information" can be also used to indicate, for example, "XX table" and "XX list" in order to indicate that the various kinds of information do not depend on the data structure. Expressions such as "identification information," an "identifier(s)," a "name(s)," an "ID(s)," and a "number(s)" may be used to explain the details of each piece of information; however, these expressions can be replaceable with each other.

This embodiment discloses a distributed storage system capable of implementing deduplication. The distributed storage system is configured by connecting a plurality of computer nodes, each of which includes a storage device, via a network. The distributed storage system implements a virtual storage system that implements a storage pool (which may be simply referred to as a pool) by using the storage devices of the plurality of computer nodes.

In this embodiment, the distributed storage system provides a host with virtual volumes. The distributed storage system allocates a logical storage area from a pool (storage pool) to a virtual storage area (a storage area provided by a virtual volume) to which a write access has been made. One pool is composed of one or more logical volumes. This logical volume is also called a pool volume. An entity of a pool volume is a storage area in a disk drive. Storage areas of a disk drive for another computer node can be allocated to the pool volume.

In this embodiment, the distributed storage system can deduplicate data stored in a computer node(s). When certain data and another data containing the same content as the certain data (duplicate data) exist, the deduplication can save storage areas which are necessary to store these pieces of data, by replacing one of the data with pointer information indicative of the other data and deleting the one data. The deduplication can be executed within one computer node and can be also executed across a plurality of computer nodes. The former deduplication will be referred to as the node deduplication and the latter deduplication will be referred to as the inter-node deduplication. When reading the deduplicated data, it is necessary to read the entity of such data (which will be referred to as the relevant data) in accordance with the pointer information. When the relevant data is stored in a computer node which has received a read request, the relevant data is read from that computer node. On the other hand, when the relevant data is stored in another computer node (which will be referred to as the second computer node) which is different from the computer node which has received the read request (which will be referred the first computer node), the first computer node needs to transfer the read request to the second computer node and transfer the relevant data from the second computer node to the first computer node via the network. Such read processing that requires data communications from the second computer node to the first computer node to read the deduplicated data will be referred to as the inter-node duplicate data reading.

In this embodiment, deduplication units are chunks. A virtual chunk is a partial storage area obtained by dividing a virtual volume by a fixed length. A logical chunk is a partial storage area obtained by dividing a pool volume by the fixed length. The size of a virtual chunk is the same as the size of a logical chunk and the size of a virtual chunk and a logical chunk is the same as the size of a page or smaller than the size of a page. Mappings between virtual chunks and logical chunks (mappings managed by a deduplication mapping table 234 described later) are managed at a computer node. The node deduplication and the inter-node deduplication are implemented by, for example, updates of these mappings.

In this embodiment, a virtual page is a partial storage area obtained by dividing a virtual volume by a fixed length and any one of computer nodes 101 is associated with virtual pages (however, none of the computer nodes 101 is associated with the virtual pages in the initial state). Incidentally, a computer node 101 associated with a virtual page may be changed to a computer node 101 whose I/O frequency to that virtual page is the highest, in accordance with the I/O frequency to virtual pages of each computer node 101 (which will be referred to as the I/O frequency or the access frequency). In this case, data in the relevant virtual page (user data) is migrated to the computer node 101 which is the changed destination. Furthermore, along with that migration, the aforementioned mapping between the virtual chunk and the logical chunk may sometimes need to be updated.

In this embodiment, storage devices include a RAID system including one storage drive such as an HDD or an SSD and a plurality of storage drives, and a plurality of RAID systems. A stripe or stripe data is a unit which is the basis to generate a redundant code for data protection. The stripe may sometimes be called "user data" in order to distinguish the stripe from the redundant code. The stripe is stored in storage devices in a computer node and is also used to generate a redundant code at another computer node. A stripe is composed of one or more logical chunks and data is made redundant on a stripe basis.

Now, the relationship between pages, chunks, and stripes according to this embodiment will be explained. In one example, a page size is an integer multiple of a chunk size (multiplied by one or more); and a stripe size is an integer multiple of the page size (multiplied by one or more). In another example, the stripe size is an integer multiple of the chunk size (multiplied by one or more) and the page size is an integer multiple of the stripe size (multiplied by one or more).

FIG. 1 illustrates the outlines of judgment methods for executing the inter-node deduplication according to an example of this embodiment. In one example of this embodiment, there are a first judgment method and a second judgment method. Computer nodes 101P, 101Q are coupled to each other via a network. Computer nodes 101R, 101S are also coupled to each other via the network. In the following description, the computer node(s) will be also simply referred to as the node(s).

FIG. 1 "Judgment Method (1) for Executing Inter-Node Deduplication" is a conceptual diagram for explaining the first judgment method.

By the first judgment method, whether data stored in a virtual storage area should be deduplicated or not is judged on the basis of I/O load information relating to the performance of nodes such as "network load caused by the inter-node duplicate data reading," "average response time," and "average throughput" with respect to the virtual storage area provided by the virtual volume.

The virtual volume is managed by dividing it into data units such as virtual chunks which are storage areas of a fixed length. A data unit may include duplicate data or may not include it. I/O frequency is recorded for each data unit at each computer node. Graph (a) of FIG. 1 illustrates a conceptual diagram of a result of tallying I/O frequencies of data units of all the computer nodes. The data units are rearranged in ascending order with respect to the I/O frequency. By the first judgment method, a data unit on the left side of a data unit threshold P is selected as a candidate for the inter-node deduplication. The data unit is selected in ascending order with respect to the I/O frequency. Regarding the inter-node deduplication, duplicate data contained in the selected data unit is deduplicated. By the first judgment method, the inter-node deduplication cancellation is executed on the duplicate data to which the inter-node deduplication was applied, from among the duplicate data contained in the data units on the right side of the data unit threshold P. The inter-node deduplication cancellation cancels the inter-node deduplication, that is, makes the duplicate data return to the state before the inter-node deduplication was executed. Consequently, the inter-node duplicate data reading of a data unit with high I/O frequency will not occur and the bottleneck of the I/O load will be solved. The data unit threshold P is determined based on indices representing the I/O load on the relevant node such as the "network load caused by the inter-node duplicate data reading," the "average response time," and the "average throughput" which are estimated based on the information of the I/O frequency and the response time of each data unit, and some thresholds. The data unit threshold P can be set to minimum values of data unit thresholds P1, P2, and, P3 as described below.

Graph (b) in FIG. 1 is a conceptual diagram of a predicted value (Y1) of the network load caused by the deduplication inter-node reading. Graph (b) shares the same horizontal axis with graph (a). The vertical axis of graph (b) represents a predicted value of the network load caused by the inter-node duplicate data reading which occurs when the inter-node deduplication is executed on a data unit on the left side of X that is a certain value on the horizontal axis. As the value of the horizontal axis becomes larger, the number of pieces of duplicate data which are targets of the inter-node deduplication becomes larger. So, as a result, the predicted value of the network load becomes larger. The data unit threshold P1 (P1 in FIG. 1) is determined by a predetermined threshold T1 (threshold T1 in FIG. 1). In this embodiment, an increase of the network load caused by executing the inter-node deduplication can be suppressed by comparing the predicted value Y1 with the threshold T1 and not executing the inter-node deduplication on a data unit(s) on the right side of the data unit threshold P1 depending on the circumstances.

Graph (c) in FIG. 1 is a conceptual diagram of a predicted value (Y2) of the average response time (average I/O response time) of the distributed storage system. Graph (c) shares the same horizontal axis with graph (a). The vertical axis of graph (c) represents a predicted value of the average response time of the distributed storage system when the inter-node deduplication is executed on a data unit on the left side of X that is a certain value on the horizontal axis. As the value of the horizontal axis becomes larger, the number of pieces of duplicate data which are targets of the inter-node deduplication becomes larger. So, as a result, the predicted value of the average I/O response time becomes larger. The data unit threshold P2 (P2 in FIG. 1) is determined by a predetermined threshold T2 (threshold T2 in FIG. 1). In this embodiment, extension of the average response time caused by executing the inter-node deduplication can be suppressed by comparing the predicted value Y2 of the average response time with the threshold T2 and not executing the inter-node deduplication on a data unit(s) on the right side of the data unit threshold P2 depending on the circumstances.

Graph (d) in FIG. 1 is a conceptual diagram of a predicted value of the average throughput of the distributed storage system. Graph (d) shares the horizontal axis with graph (a). The vertical axis of graph (d) represents a predicted value of the average throughput of the distributed storage system when the inter-node deduplication is executed on a data unit on the left side of X that is a certain value on the horizontal axis. As the value of the horizontal axis becomes larger, the number of pieces of duplicate data which are targets of the inter-node deduplication becomes larger. So, as a result, the predicted value of the average throughput becomes smaller. The data unit threshold P3 (P3 in FIG. 1) is determined by a predetermined threshold T3 (threshold T3 in FIG. 1). In this embodiment, a reduction of the average throughput caused by executing the inter-node deduplication can be suppressed by comparing the predicted value Y3 of the average throughput with the threshold T3 and not executing the inter-node deduplication on a data unit(s) on the right side of the data unit threshold P3 depending on the circumstances.

The first judgment method as described above can judge whether to execute the inter-node deduplication, on the basis of the I/O load predicted based on the I/O frequency and the response time for each data unit (the "network load caused by the inter-node duplicate data reading," the "average response time," and the "average throughput") and some thresholds. By following this judgment method, the distributed storage system can be controlled so that: the inter-node deduplication will be executed on the duplicate data contained in the data unit(s) with a small influence on the I/O load; the inter-node deduplication will not be executed on the duplicate data contained in the data unit(s) with a large influence on the I/O load; and the inter-node deduplication cancellation will be executed on the duplicate data contained in the data unit(s) with a large influence on the I/O load. Furthermore, by using this judgment method, only the data unit(s) with a small influence on the I/O load becomes the deduplication target and the data unit(s) with a large influence on the I/O load does not become the deduplication target. So, the inter-node duplicate data reading executed along with the inter-node deduplication is unnecessary for the data unit(s) with a large influence on the I/O load and both the efficient data amount reduction and the high performance can be achieved. Furthermore, the "network load caused by the inter-node duplicate data reading" which is caused by the inter-node deduplication is suppressed and I/O performance degradation of the relevant node(s) such as the "average response time" and the "average throughput" can be suppressed, and both the efficient data amount reduction and the high performance can be achieved.

FIG. 1 "Judgment Method (2) for Executing Inter-Node Deduplication" is a conceptual diagram for explaining the second judgment method.

The second judgment method judges whether data stored in the virtual storage area should be deduplicated or not, on the basis of the size of relative data amount reduction effect of the inter-node deduplication.

Referring to FIG. 1, each of computer nodes 101R, 101S stores 9 pieces of duplicate data d (99A to 99H and 99I to 99Q) of data units. The duplicate data d (99A to 99G) and the duplicate data d (99I to 99P) have already been deduplicated by the node deduplication. Either one piece of the duplicate data d (99H, 99Q) can be deduplicated by the inter-node deduplication. The second judgment method judges whether to execute the inter-node deduplication or not in such situation.

Here, "r" is defined as the "number of reductions by the node deduplication." The second judgment method uses the following criterion formula.

$$r < \text{"Threshold for Criterion Formula"} \quad \text{Criterion Formula}$$

In the example illustrated in FIG. 1, the data amount becomes $1/(r+2)$ by executing the inter-node deduplication and comparing the result with a case where the deduplication is not executed at all. Therefore, when the value of r in the criterion formula is smaller, the data amount reduction effect of the inter-node deduplication to be executed becomes large. Furthermore, when the value of r is smaller, there is less possibility of occurrence of the inter-node duplicate data reading. So, it is highly possible that less performance degradation will be caused by the inter-node deduplication to be executed.

For example, assuming that the threshold as the "threshold for the criterion formula" is 10, because eight pieces of duplicate data have been deleted in each of the node 101R and the node 101S in FIG. 1, the value of r is 16 and the judgment result of the criterion formula is "False." In this example, it is judged based on the result of the criterion formula that the inter-node deduplication of the duplicate data d (99H, 99Q) will not be executed.

By the second judgment method, only the duplicate data which is related to the inter-node deduplication with a relatively large data amount reduction effect and less performance degradation can be selected as a node deduplication target candidate.

In an example of this embodiment, the computer node can use either the above-described judgment method (1) or (2) for executing the inter-node deduplication, or both the judgment methods (1) and (2), when executing the inter-node deduplication.

As a result, the judgment methods for executing the inter-node deduplication as explained with reference to FIG. 1 make it possible to execute the inter-node deduplication while suppressing the performance degradation and both the high data amount reduction effect and the high performance can be achieved.

FIG. 2 illustrates a system configuration example of the distributed storage system. A node 101 has the configuration of, for example, a general server computer. A hardware configuration of the node 101 is not particularly limited. The node 101 is connected to other nodes 101 through their ports 106 via a network 103. The network 103 is composed of, for example, InfiniBand or Ethernet (registered trademark).

A plurality of nodes 101 form a domain 102. The domain 102 may be designed to correspond to, for example, geographical areas or the topology of a virtual or physical network 103. A network 104 connects a plurality of domains 102. In the following explanation, let us assume that a domain is associated with a site which is geographically separated.

Regarding the internal configuration of the node 101, the port 106, a processor package 111, disk drives (hereinafter sometimes referred to as the drives) 113 are connected via an internal network 112. The processor package 111 includes a memory 118 and a processor 119. Under this circumstance, the node 101 may not include the disk drives 113, but instead, external storage devices for external attachment may be connected to the node 101 and data may be stored in the external storage devices.

The memory 118 stores necessary control information for the processor 119 to process read and write commands and execute a storage function and also stores cache data of the storage apparatus. Moreover, the memory 118 stores, for example, programs executed by the processor 119. The memory 118 may be a volatile DRAM (Dynamic Random Access Memory) or a nonvolatile SCM (Storage Class Memory).

The drives 113 are composed of, for example, hard disk drives or SSDs (Solid State Drives) with interfaces such as FC (Fibre Channel), SAS (Serial Attached SCSI), and SATA (Serial Advanced Technology Attachment).

An SCM such as NAND, PRAM (Phase Change Random Access Memory), or ReRAM (Resistance Random Access Memory) may be used or a volatile memory may be used. When the volatile memory is used, the storage devices may be made nonvolatile by using batteries.

Each drive group constitutes a RAID. The drives, the RAID, and their aggregates are storage devices, respectively.

Figure 3:
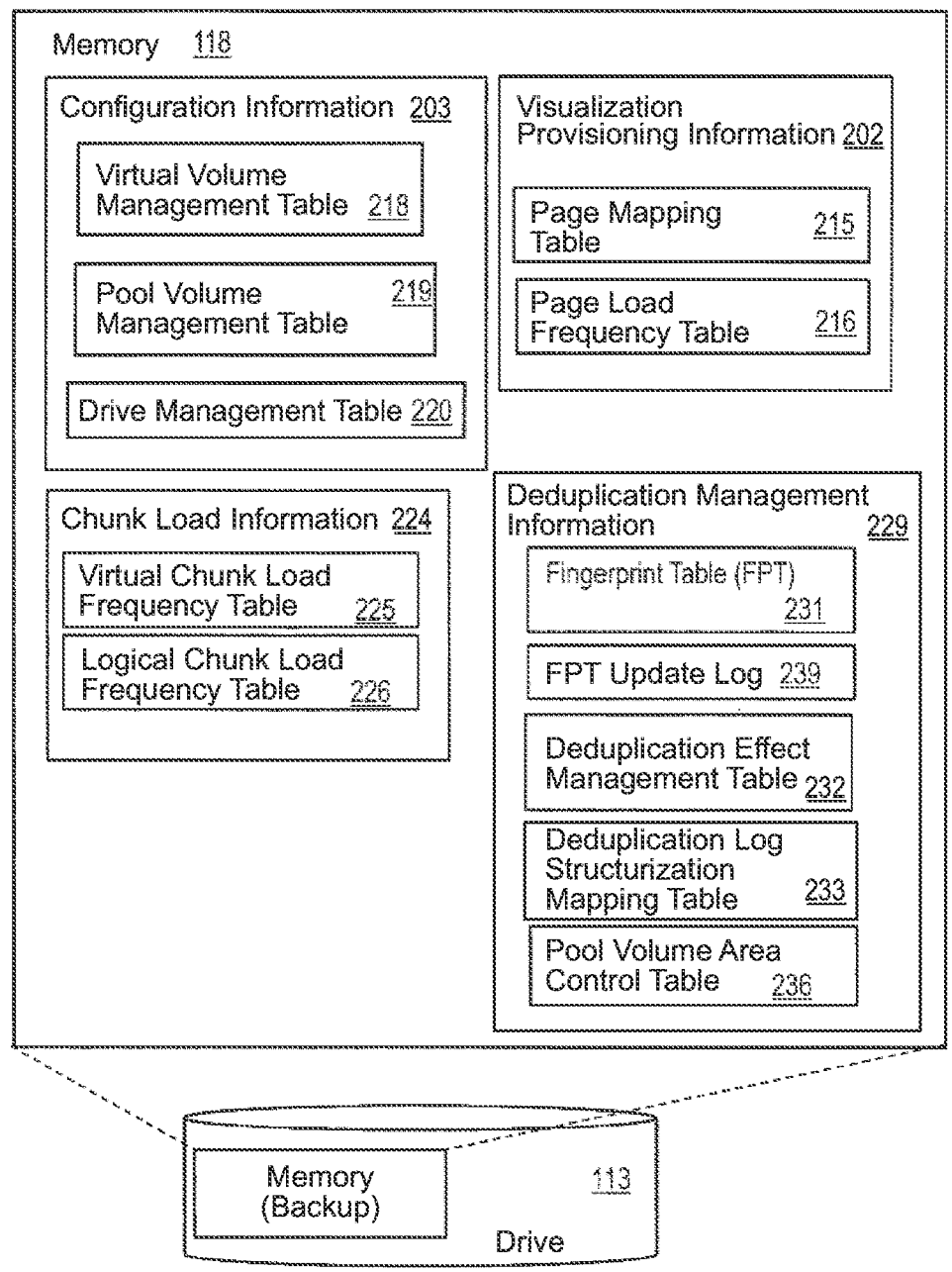
FIG. 3 illustrates information for controlling the distributed storage system.

FIG. 3 illustrates information for controlling the distributed storage system. The memory 118 stores, in addition to the information illustrated in FIG. 3, various types of programs including storage programs for implementing the storage function, an OS, and interface programs. The memory 118 may further store application programs for performing tasks.

Visualization provisioning information 202 includes a page mapping table 215 and a page load frequency table 216. Configuration information 203 includes a virtual volume management table 218, a pool volume management table 219, and a drive management table 220.

Chunk load information 224 is information about the I/O frequency of chunks and includes a virtual chunk load frequency table 225 and a logical chunk load frequency table 226. Deduplication management information 229 is information related to deduplication processing and includes a Fingerprint Table (FPT) 231, an FPT update log 239, a deduplication effect management table 232, a deduplication log structure mapping table 233, and a pool volume area control table 236.

Copies of whole or part of the above-described information may be stored in the drives 113 synchronously or asynchronously. The node 101 may retain the above-described information, for example, with respect to each pool. One pool is composed of one or more logical volumes. This logical volume is also called a pool volume. The entity of a pool volume is a storage area of the drives 113. Storage areas of the drives of other nodes 101 can be allocated to the pool volume(s).

Structure examples of the tables showing the information retained by the node 101 will be explained below. Only some entries are indicated in each table. A blank cell in each table is a cell in which a description of data is omitted. Regarding cells of the table, "0x" represents a hexadecimal number. The drive number is unique in the node and the node number is unique in the system. The site number is unique in the system. Incidentally, the node number may be unique in the site.

FIG. 4A to FIG. 4C illustrate structure examples of the tables showing the information included in the configuration information 203. FIG. 4A to FIG. 4C show management information on the basis of different storage resource types. FIG. 4A illustrates a structure example of the virtual volume management table 218. The virtual volume management table 218 shows information about virtual volumes.

In this example, the virtual volume management table 218 shows the information about virtual volumes provided by the nodes 101 which retain the relevant information 218. The nodes 101 receive accesses to the provided virtual volumes. The virtual volume management table 218 may retain information about virtual volumes which are not provided by the local node in preparation for the occurrence of failures. Under this circumstance, one computer node 101 which retains the relevant information 218 may solely provide one virtual volume or a plurality of computer nodes 101 which retains the relevant information 218 may provide one virtual volume.

The virtual volume management table 218 includes an identifier for uniquely identifying each virtual volume in the system (virtual volume number), the size of each virtual volume (capacity), and a node number list of nodes providing each virtual volume (hereinafter referred to as the owner nodes). The virtual volume size is not a total amount of allocated logical chunks, but represents a virtual capacity (maximum capacity) of the virtual volume.

FIG. 4B illustrates a structure example of the pool volume management table 219. The pool volume management table 219 shows information about pool volumes. In this example, the pool volume management table 219 shows information about pool volumes provided by the nodes 101 which retain the relevant information 219. The pool volume management table 219 includes information of an identifier for uniquely identifying each pool volume in the system (pool volume number), the size (capacity) of each pool volume, and the node number of the node providing each pool volume.

FIG. 4C illustrates a structure example of the drive management table 220. The drive management table 220 shows drives allocated to each pool volume. In this example, the drive management table 220 shows information about the drives 113 for the local system included by the node 101 which retains the relevant information 220.

The drive management table 220 includes information about an identifier for uniquely identifying each pool volume in the system (pool volume number), a drive type (such as SSDs and NL-SAS drives), a set of striped drive numbers (a set of driver numbers constituting a RAID), and drive size (capacity) with respect to each pool volume. When striping is not performed, only one drive is allocated to a pool volume. Incidentally, different areas in one drive can be allocated to different pool volumes.

FIG. 5A to FIG. 5B show information included in the visualization provisioning information 202. FIG. 5A illustrates a structure example of the page mapping table 215.

The page mapping table 215 retains the correspondence relationship between virtual pages of virtual volumes and the computer nodes 101.

In this example, the page mapping table 215 retains information about virtual volumes provided by the nodes 101 which retain the relevant information 215. A virtual page is associated with any one of the computer nodes 101 (one of the owner nodes of the virtual volume). In other words, it can be also said that a virtual page is allocated to any one of the computer nodes 101 (the owner node). This allocation of the computer node 101 to a virtual page is performed as triggered by a first write request to the virtual page. Incidentally, it is also possible to allow a computer node 101, other than the computer node 101 to which the virtual page is allocated, to access the relevant virtual page.

Incidentally, in the following description, the operation to associate a virtual page with a computer node in the page mapping table 215 may be expressed as "allocating a computer node to a virtual page" or "allocating a virtual page to a computer node."

The page mapping table 215 retains a virtual volume number, a starting LBA (Logical Block Address) and address range of a virtual page of a virtual volume, and a node number of a computer node 101 allocated to the virtual page. When no computer node 101 is allocated to the virtual page, an invalid value is recorded in the node number column of the page mapping table 215.

FIG. 5B illustrates a structure example of the page load frequency table 216. The page load frequency table 216 retains a history of I/O frequency (access frequency) with respect to each virtual page and a history of "inter-node duplicate data reading frequency" with respect to each virtual page. Specifically speaking, the page load frequency table 216 retains a virtual volume number, a starting LBA and address range of a virtual page of a virtual volume, access frequency with respect to the relevant area, "inter-node duplicate data reading frequency" with respect to the relevant area, and I/O response time with respect to the relevant area.

The page load frequency table 216 retains information about virtual volumes provided by the node 101 which retains the relevant table 216. Furthermore, the page load frequency table 216 retains information about accesses which the node retaining the relevant table 216 received from its own node and other nodes.

The information about the access frequency and the response time may be acquired and managed for each access source node or acquired and managed by dividing the information into read accesses and write accesses. The node 101 may acquire and manage the information about the access frequency and the response time by separating sequential accesses from random accesses or may acquire and manage the information about the access frequency and the response time in a plurality of measurement cycles.

The "inter-node duplicate data reading frequency" indicates information about the inter-node duplicate data reading frequency with respect to virtual pages. The "inter-node duplicate data reading frequency" may be acquired and managed with respect to each access source node. Under this circumstance, the inter-node duplicate data reading means reading of a logical chunk, which is allocated to this virtual page, from another node as a result of the execution of the inter-node deduplication.

FIG. 6A to FIG. 6B show information included in the chunk load information 224.

FIG. 6A illustrates a structure example of the virtual chunk load frequency table 225. The virtual chunk load frequency table 225 retains a history of the I/O frequency (access frequency) with respect to each virtual chunk and a history of the "inter-node duplicate data reading frequency" with respect to each virtual chunk. Specifically speaking, the virtual chunk load frequency table 225 retains a virtual volume number, starting LBA, and address range of a virtual chunk of a virtual volume, access frequency with respect to the relevant area, the "inter-node duplicate data reading frequency" with respect to the relevant area, and I/O response time with respect to the relevant area.

The virtual chunk load frequency table 225 is similar to the page load frequency table 216 except the difference, that is, the virtual chunk load frequency table 225 retains the information relating to not virtual pages, but virtual chunks. So, an explanation about it has been omitted.

FIG. 6B illustrates a structure example of the logical chunk load frequency table 226. The logical chunk load frequency table 226 retains a history of the I/O frequency (access frequency) with respect to each logical chunk. The logical chunk load frequency table 226 is similar to the virtual chunk load frequency table 225 except that logical chunk load frequency table 226 retains the information relating to not virtual chunks, but logical chunks. So, an explanation about it has been omitted.

FIG. 7A to FIG. 7C, FIG. 8, and FIG. 9 illustrate information included in the deduplication management information 229.

FIG. 7A illustrates a structure example of the Fingerprint Table (FPT) 231. The FPT 231 is a table used for deduplication processing in FIG. 13A and is an index for efficient search of the duplicate data. The FPT 231 stores hash values (Fingerprint [FP]) of data of virtual chunks, which are calculated for each virtual chunk. The hash value can be calculated by using a well-known hash function such as CRC, SHA1, or MD5.

The FPT 231 retains (1) the FP, (2) the virtual volume number, (3) the LBA of a virtual volume, and (4) the address range. The information (2) to (4) is information for uniquely identifying the virtual chunk in the system.

The FPT 231 is configured so that it is divided into a plurality of partial tables and each partial table is retained by a plurality of computer nodes 101 included in the distributed storage system. Another computer node 101 separate from a computer node 101 which retains a partial table may retain a duplicate of the partial table in preparation for the occurrence of failures.

Methods for dividing the FPT 231 into a plurality of partial tables include, for example: (1) a method for dividing the FPT 231 by making a computer node 101, which is determined based on a value calculated as an FP value % N (% is an operator for calculating the remainder) where N represents the number of computer nodes 101 which retain the partial table, retain entries including a certain FP value; and (2) a method for dividing the FPT 231 by associating a predetermined range of the FP value with a certain computer node 101 and making the computer node 101 retain only entries including the FP value associated with its own computer node 101. The FPT 231 may be divided in accordance with specified rules other than the above-mentioned methods.

The FPT 231 may be configured so that one computer node 101 included in the distributed storage system retains information about all virtual chunks in the distributed storage system. Another computer node 101 may retain a duplicate of the FPT 231 in preparation for the occurrence of failures.

FIG. 7B illustrates a structure example of the FPT update log 239. The FPT update log 239 records update operations on the FPT 231. The update operation on the FPT 231 is a registration or deletion of an entry (row) of the FPT 231.

The FPT update log 239 retains (1) the FP, (2) the virtual volume number, (3) the LBA of a virtual volume, (4) the address range, and (5) the operation. The information (2) to (4) is information for uniquely identifying the virtual chunk in the system. The column of (5) the operation is information for designating the update operation on the FPT 231 and stores the value of either the "registration" or the "deletion."

Next, the deduplication types will be explained before explaining about FIG. 7C. The deduplication is mainly classified into the node deduplication and the inter-node deduplication as stated earlier. The inter-node deduplication is either one of: site deduplication which is deduplication across computer nodes 101 within the same site; and geo-deduplication which is deduplication across computer nodes 101 in different sites. In other words, the deduplication type is any one of (1) the node deduplication, (2) the site deduplication, and (3) the geo-deduplication.

FIG. 7C illustrates a structure example of the deduplication effect management table 232. The deduplication effect management table 232 is a table for managing how many logical chunks having a certain FP are deduplicated by means of the node deduplication, the site deduplication, and the geo-deduplication, respectively, in the distributed storage system. One of the computer nodes 101 manages this table. Another computer node 101 may retain a duplicate of this table.

The deduplication effect management table 232 retains (1) the node number, (2) the FP, (3) the number of node deduplication reductions, (4) the number of site deduplication reductions, and (5) the number of geo-deduplication reductions. The information (3)(4)(5) is information indicating how many virtual chunks with the relevant FP included in the virtual page, among those identified with (1) the node number in the page mapping table 215, are deduplicated by means of the node deduplication, the site deduplication, and the geo-deduplication, respectively.

FIG. 8 illustrates a structure example of the deduplication log structure mapping table 233. Arrows in FIG. 8 represent pointers. The deduplication log structure mapping table 233 includes a deduplication mapping table 234 and a deduplication inverse mapping table 235.

The deduplication mapping table 234 manages mappings between virtual chunks in virtual volumes and logical chunks in pool volumes. The computer node 101 can become aware of a logical chunk storing address (logical address) mapped to the relevant virtual chunk from the address (LBA) of a virtual volume corresponding to a virtual chunk. The deduplication mapping table 234 associates a user data storing address (LBA) in a virtual volume with a user data storing address (logical address) in a pool volume. In other words, it can be said that the deduplication mapping table 234 manages mappings between virtual addresses and logical addresses. The virtual address is information for uniquely identifying a virtual chunk in the system and the logical address is information for uniquely identifying a logical chunk in the system. Incidentally, in some cases, no logical chunk may be mapped to a virtual chunk.

Figure 13A:
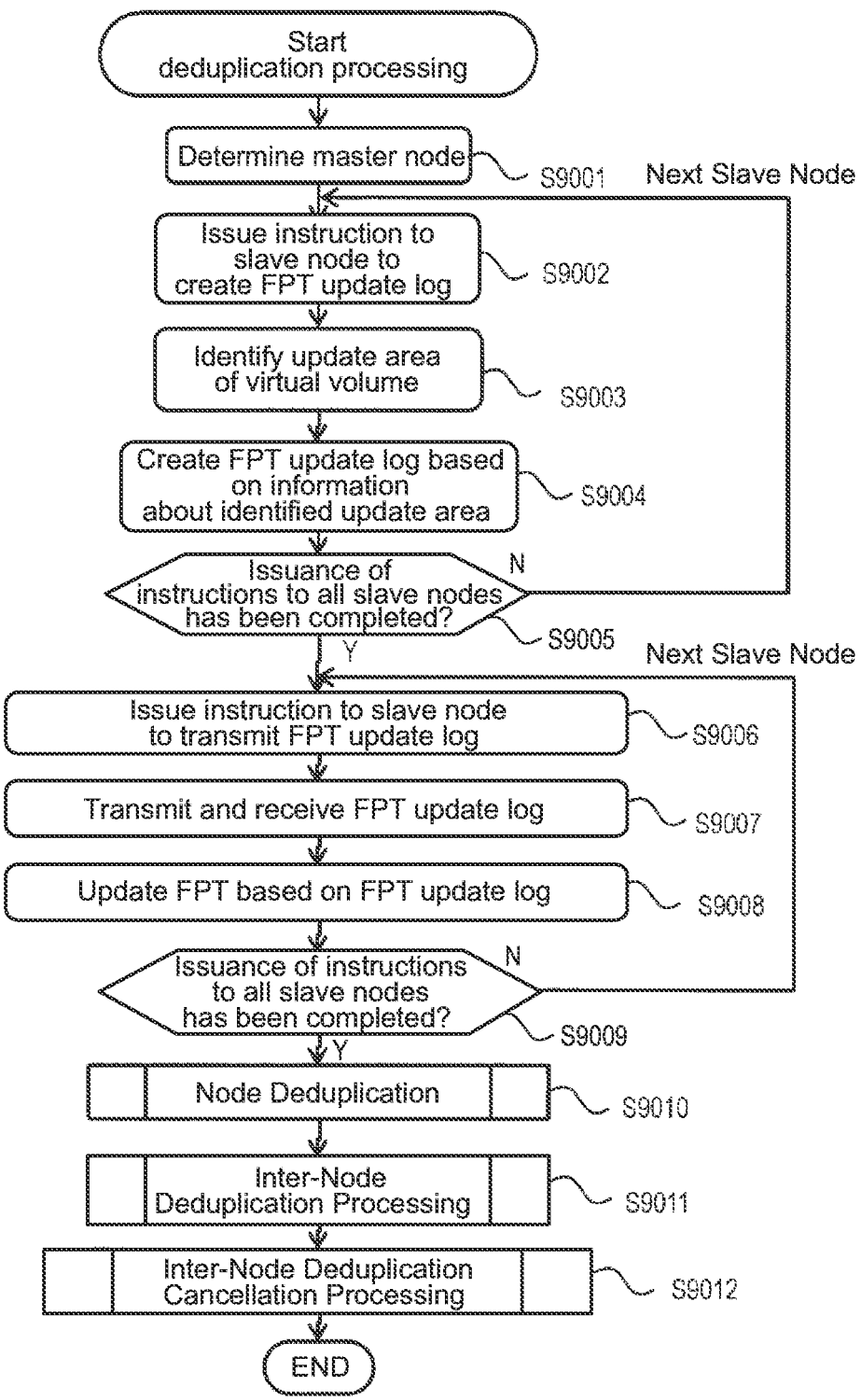
FIG. 13A illustrates a flowchart of deduplication processing.

The virtual volume storing address relating to a virtual chunk is designated with the virtual volume number and the address (LBA). The pool volume storing address relating to a logical chunk is designated with the pool volume number, the logical address (LBA), and the data length (LEN). The deduplication mapping table 234 also records information about the state relating to a virtual chunk. The relevant information includes information indicative of whether or not the relevant virtual chunk has been updated since the execution of the deduplication processing in FIG. 13A ("YES" or "NO"). An initial value of the relevant information is "YES." The value of the FP calculated at the time of execution of the deduplication processing in FIG. 13A is recorded in the "FP" of the deduplication mapping table 234. An initial value of the FP" of the deduplication mapping table 234 is an invalid value.

Incidentally, the site number may be included in the pool volume storing address relating to a logical chunk. In this case, when updating the deduplication mapping table 234, the site number is also set. In the following description, setting of the site number may not be sometimes clearly specified.

In an example of FIG. 8, it is shown that data of a virtual chunk which is designated with the virtual volume number=0 and LBA=0 is stored in an area of a logical chunk designated with the pool volume number=0, LBA (logical address)=0x0003, LEN=8.

The distributed storage system of this example stores data, which is written to a virtual volume, in a pool volume in a log structuration format. If such log structuration format is used when the computer node 101 updates the data of a virtual chunk with new data, the computer node 101 adds the new data to a new logical chunk without updating the data of the relevant logical chunk with the new data. Unnecessary data (logical chunk) is deleted as necessary.

The deduplication inverse mapping table 235 is an inverse conversion table of the above-mentioned table 234. Specifically speaking, reference is made to the deduplication inverse mapping table 235 in order to convert the address of a pool volume to the address of a virtual volume. The deduplication inverse mapping table 235 includes tables 251, each of which indicates the address of a virtual volume corresponding to each address area 250 (corresponding to a logical chunk) where data is stored in the pool volume 1303. Incidentally, in the deduplication inverse mapping table 235, a plurality of virtual chunks may sometimes be associated with one logical chunk as a result of deduplication between virtual chunks.

Each table 251 includes the number of indices (the number of references), an update date and time, and reference (the virtual volume number, LBA, and size of the corresponding virtual volume).

In the example of FIG. 8, the number of indices is 1 and the reference to the address of a virtual volume designated with the virtual volume number=1, LBA=1, SIZE=8 is retained.

The computer node 101 updates the deduplication log structure mapping table 233 in synchronization with writing of data to the pool volume.

Figure 9:
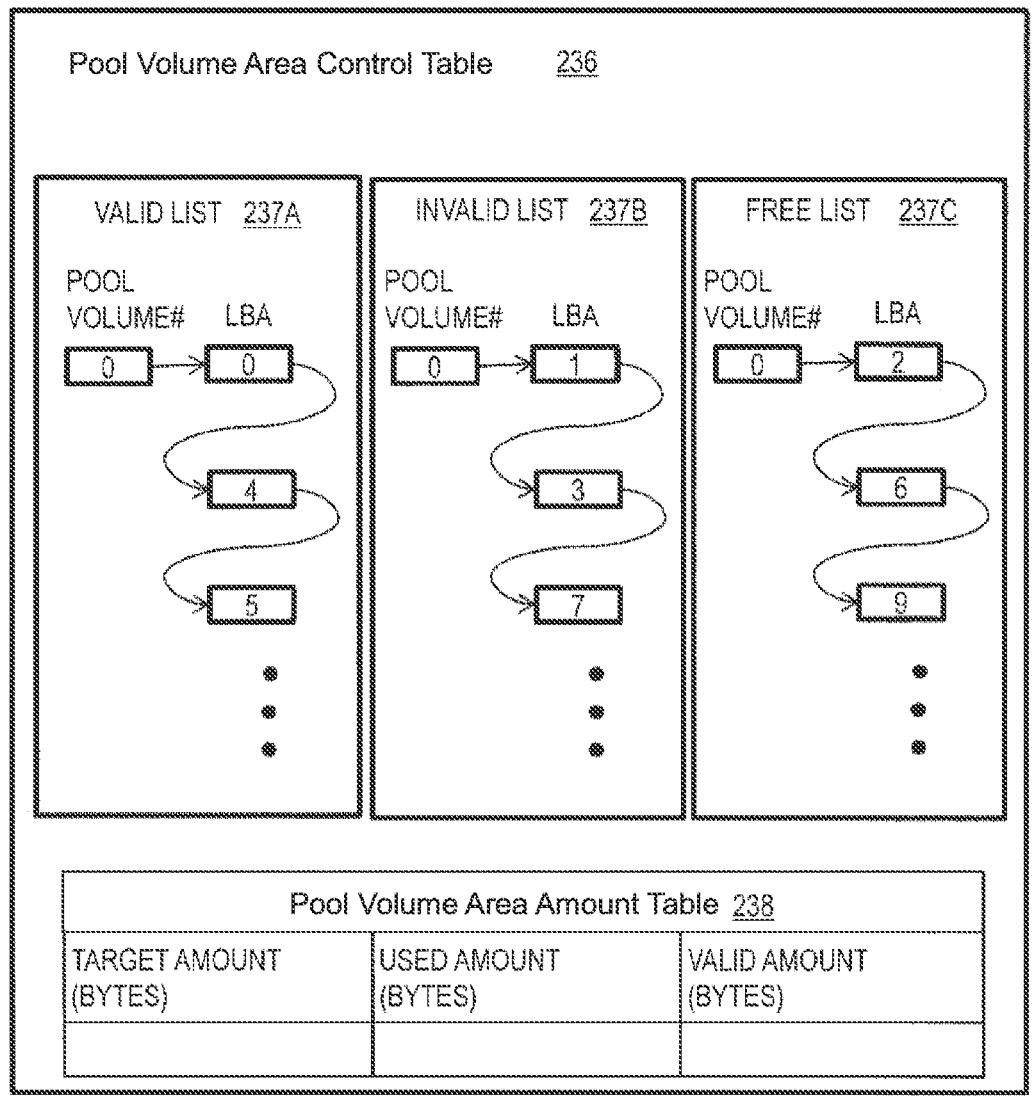
FIG. 9 illustrates a structure example of a pool volume area control table.

FIG. 9 illustrates a structure example of the pool volume area control table 236. Arrows in FIG. 9 represents pointers. The pool volume area control table 236 includes a valid list 237A, an invalid list 237B, a free list 237C, and a pool volume area amount table 238. The pool volume area control table 236 manages pool volume areas in the computer node 101. Regarding the lists 237A to 237C, the area of each pool volume is managed on the basis of a logical chunk indicated with the pool volume number and the LBA in the pool volume.

The valid list 237A is a list of valid areas. A valid area is a logical chunk area to store the latest user data. In other words, the valid area is a logical chunk area allocated to a virtual chunk. In an example of FIG. 9, each block with the LBA 0, 4, or 5 stores valid data in a pool volume with the pool volume number 0.

The invalid list 237B is a list of invalid areas. An invalid area is a logical chuck area to store old user data. In other words, the invalid area is a logical chunk area which is not allocated to a virtual chunk. In the example of FIG. 9, each block with the LBA 1, 3, or 7 stores invalid data in the pool volume with the pool volume number 0. The free list 237C is a list of unused areas. An unused area is a logical chunk area to store format data (data composed of only a bit value 0) and is created by formatting the invalid area. In other words, the unused area is a logical chunk area to which data can be written immediately.

The pool volume area amount table 238 manages a target use amount, an actual use amount, a valid area amount (valid amount) of pool volume areas in the computer node 101. The computer node 101 updates the pool volume area control table 236 synchronously or asynchronously with the host I/O.

Figure 10:
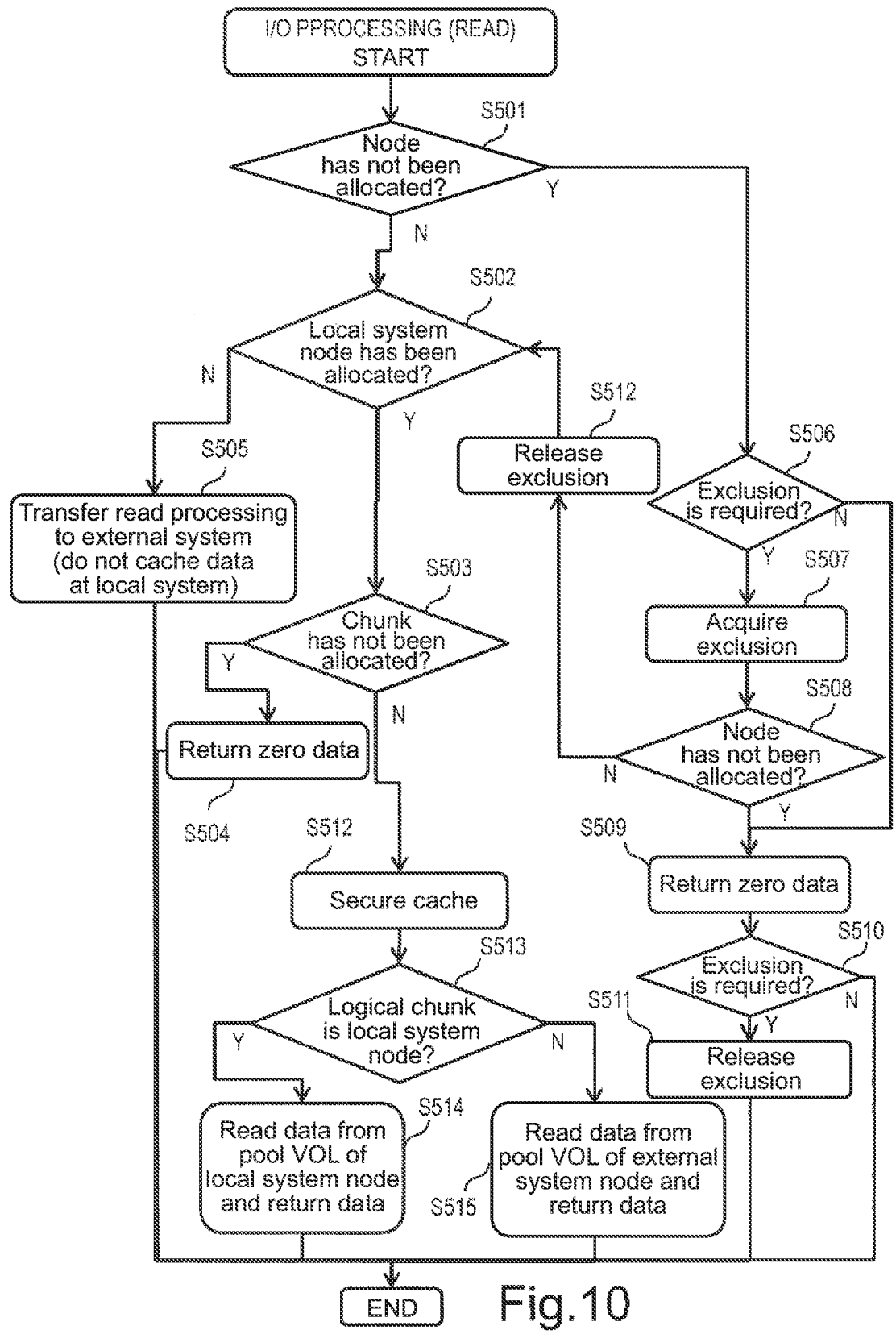
FIG. 10 illustrates a flowchart of read processing of the distributed storage system.

FIG. 10 illustrates a flow chart of read processing of the distributed storage system. The processor 119 judges whether a computer node 101 has not been allocated to an access destination virtual page (hereinafter also simply referred to as the virtual page) with respect to a designated address of a received read command (which will be also referred to as the relevant designated address), by referring to the page mapping table 215 (S501). The designated address is designated, for example, with the virtual volume number and the LBA. The LBA is expressed with a starting LBA and a block length.

When the computer node 101 has not been allocated to the virtual page (S501: Y), the processor 119 judges whether the exclusion is necessary or not (S506). When the processor 119 refers to the virtual volume management table 218 and judges that the owner node of the virtual volume is only the local node itself, the processor 119 determines that the exclusion is unnecessary. If the processor 119 judges that the owner node of the virtual volume is not only the local node, the processor 119 determines that the exclusion is necessary.

When the processor 119 determines that the exclusion is necessary (S506: Y), the processor 119 acquires the exclusion (S507) and then judges again whether the computer node 101 has not been allocated to the virtual page (S508). This is because there is a possibility that the node might have been allocated to the virtual page between S501 and S508 (that is, during the processing of S506 or S507). As an example of the exclusion method, the processor 119 identifies a representative node which is uniquely determined from a read address, by using a hash function and requests mediation by the representative node, and the representative node performs the mediation.

When the computer node 101 has been allocated to the virtual page (S508: N), the processor 119 cancels the exclusion (S512) and proceeds to step S502. When the computer node 101 has not been allocated to the virtual page (S508: Y), the processor 119 returns zero data (S509) and judges whether the exclusion is necessary or not, in the same manner as in the judgement in step S506 (S510). When the exclusion is necessary (S510: Y), the exclusion has already been acquired in S507 and, therefore, the processor 119 releases the exclusion (S511).

In S502, the processor 119 judges whether the local system node is allocated to the virtual page or an external system node is allocated to the virtual page. Specifically speaking, the processor 119 refers to the page mapping table 215, identifies the node allocated to the virtual page, and judges whether the identified node is the local system node or the external system node.

When the computer node 101 has been allocated to the virtual page in step S501 (S501: N) and the local system node is allocated to the virtual page (S502: Y), the processor 119 refers to the deduplication mapping table 234 and judges whether a logical chunk has not been allocated to a virtual chunk corresponding to the relevant designated address (which will be referred to as the relevant virtual chunk) (S503). When the logical chunk has not been allocated in step S503 (S503: Y), the processor 119 returns zero data (S504). When the logical chunk has been allocated in step S503 (S503: N), the processor 119 secures a cache area of the local system (S512).

Now, before explaining about securing the cache, management information of cache data will be explained. The management information of the cache data includes a dirty queue, a clean queue, and a free queue. The dirty queue is a list for managing dirty data in the memory. The dirty data is any one of: user data whose redundant data has not been generated; user data whose redundant data has been generated, but has not been reflected in the drives 113; or redundant data which has not been reflected in the drives. The clean queue is a list for managing clean data in the memory. The clean data is either user data which has been reflected in the drives, or redundant data which has been reflected in the drives. The free queue is a list for managing free areas in the memory. The free areas are cache areas which are not used.

When securing a cache area, the processor 119 refers to the cache information 204 and identifies a cache area associated with the target logical address. When there is no corresponding cache area, the processor 119 secures a new area from the free queue. When the free queue is empty, the processor 119 secures a new area from the clean queue. When the clean queue is empty, the processor 119 destages an area in the dirty queue and changes it to a free area.

Next, the processor 119 refers to the deduplication mapping table 234 and the pool volume management table 219 and judges whether a logical chunk corresponding to the relevant virtual chunk (the relevant logical chunk) exists in the pool volume of the local system node or not (S513). Specifically speaking, the processor 119: firstly refers to the deduplication mapping table 234 and identifies the pool volume in which the logical chunk corresponding the relevant virtual chunk is stored; and then refers to the pool volume management table 219 and identifies the node to which the identified pool volume is provided. If the identified node is the local system node, the processor 119 determines that the judgment result of S513 is affirmative. If the identified node is not the local system node, the processor 119 determines that the judgment result of S513 is negative.

When the judgment result of S513 is affirmative (S513: Y), the processor 119 reads data of the relevant logical chunk from the pool volume of the local system node, stores the read data in the cache area secured in S512, and returns the data stored in the cache area to the host (S514).

When the judgment result of S513 is negative (S513: N), this means that the data of the relevant logical chunk is in the pool volume of the external system node, the read data is transmitted and received between the local system node and the external system node and then the data of the relevant logical chunk is returned to the host (S515). Specifically speaking, the following processing is executed. More specifically, (1) the processor 119 for the local system node transmits a read request to the external system node to read the data of the relevant logical chunk; (2) the processor 119 for the external system node which has received the read request reads the data of the relevant logical chunk from the pool volume of the external system node and transmits the read data to the local system node; and (3) the processor 119 for the local system node receives the transmitted data, stores the received data in the cache area secured in S512, and returns the data stored in the cache area to the host. (4) Since the inter-node duplicate data reading has occurred, history information is updated accordingly. Specifically speaking, the processor 119 updates the "inter-node duplicate data reading frequency" of the page load frequency table 216 and the "inter-node duplicate data reading frequency" of the virtual chunk load frequency table 225.

When the external system node (which will be referred to as the relevant external system node) is allocated to the virtual page (S502: N), the processor 119 transfers the read command to the relevant external system node (S505). The processor 119 does not cache the read data in the local system. Specifically speaking, when the allocation destination of the virtual page is another node, the processor 119 does not cache (reads through) the read data in the memory 118 for the local system and the other node 101 caches the read data. The relevant external system node executes the processing in FIG. 10 and returns the data via the local system node to the host.

Figure 11:
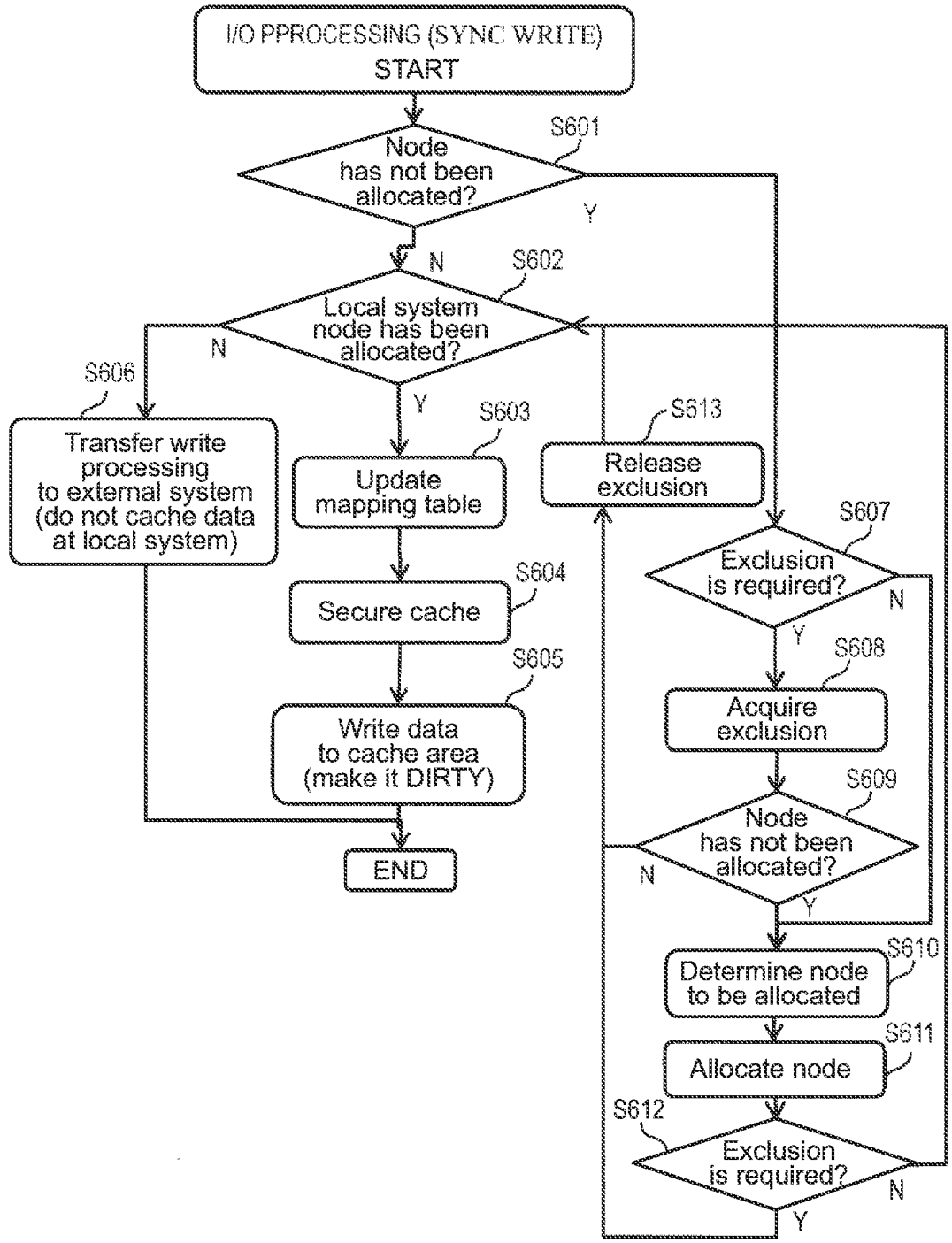
FIG. 11 illustrates a flowchart of synchronous write processing.

FIG. 11 illustrates a flowchart of synchronous write processing. This processing is executed when a write command is issued from the host (for example, an application program). This processing stores the write data in the pool volume of the local system.

The processor 119 for the node 101 which has received the write command judges whether the computer node 101 has not been allocated to an access destination virtual page (hereinafter simply referred to as the virtual page) (S601). Specifically speaking, the processor 119 refers to the page mapping table 215 and searches for the node number of the corresponding computer node 101 from the designated address (the virtual volume number and the LBA) of the write command. The processor 119 judges whether the virtual page has not been allocated to the computer node 101, by judging whether the corresponding node number is an invalid value or not.

A plurality of applications are activated in the system according to this embodiment and at least one node in the system operates each of the applications. Under this circumstance, it is believed that data read requests are often issued to the node which received the write command to write the relevant data. Therefore, regarding this application, when the node receives a write request, it prioritizes storing of data of the write request in a storage area of the relevant node. As a result, the probability capable of reading data from the relevant node in response to a read request increases and it becomes possible to respond to the read request at high speed.

However, when the performance of the drives 113 connected to the node 101 is lower than the performance of the network 103, the throughput of the system may be enhanced in some cases by distributing data to many nodes. In consideration of the above, the storage area of the allocation destination may be changed according to the performance of the network 103 and the performance of the drives 113 connected to the node 101 by using a technique such as round robin. Furthermore, not only the above-described allocation policy may be based on the index which is the performance, but also the effect against cost may be made efficient by using an index such as lifetime when flash drives are used as the drives 113.

When the computer node 101 has not been allocated to the virtual page (S601: Y), the processor 119 executes processing for allocating the computer node 101 to the virtual page. The processor 119 firstly judges whether update exclusion of the page mapping table 215 is necessary or not (S607). The reason to acquire the exclusion is to prevent allocation of a plurality of different computer nodes 101 to the virtual page when simultaneously allocating a computer node 101 to the virtual page at another node 101.

The processor 119 refers to the virtual volume management table 218; and when a node other than the local node is included as the owner node, the processor 119 determines that the exclusion is necessary; and when the owner node is only the local node, the processor 119 determines that the exclusion is unnecessary. When the processor 119 determines that the exclusion is necessary (S607: Y), the processor 119 acquires the exclusion (S608). A method for acquiring the exclusion is the same as the method indicated with respect to the read processing explained with reference to FIG. 10.

Next, the processor 119 judges again whether the computer node 101 has not been allocated to the virtual page (S609). This is because there is a possibility that another node might have acquired exclusion after judging whether the computer node 101 has been allocated to the virtual page or not in step S601 and before acquiring the exclusion in step S608.

When the computer node 101 has not been allocated to the virtual page (S609: Y), the processor 119 determines the computer node 101 to allocate the virtual page (S610). The processor 119 firstly checks if there is any free area in pool volumes of the local system.

Specifically speaking, the processor 119 refers to the target use amount and the actual use amount in the pool volume area control table 236 and judges whether the actual use amount is less than the target use amount. When the actual use amount is less than the target use amount, the processor 119 allocates the relevant virtual page to the local system node.

When the local system has no free area in the pool volumes of the local system, the processor 119 mounts a pool volume of the external system (another node) to the local system and allocates a page to that area.

After determining the allocation node, the processor 119 allocates the relevant node to the virtual page (S611). Specifically speaking, the processor 119 updates the correspondence relationship of the page mapping table 215.

Next, the processor 119 judges whether the exclusion is necessary or not (S612). This judgment is the same as that in step S607. When the exclusion is necessary (S612: Y), the processor 119 releases the acquired exclusion (S617). When the exclusion is unnecessary (S612: N), the processor 119 proceeds to step S602.

The processor 119 judges whether or not the local system node is allocated to the virtual page corresponding to the write command, by referring to the page mapping table 215 (step 602).

When the local system node is not allocated to the virtual page (S602: N), the processor 119 transfers the write command to another node 101 (S606). The other node 101 executes write processing according to this flowchart. The processor 119 does not cache the write data at the local system in order to maintain data coherency.

When the local system node is allocated to the virtual page (S602: Y), the processor 119 updates the deduplication log structure mapping table 233 (S603). The write data is stored in the pool volume (or the cache area corresponding to the pool volume) in the log structuration format.

Specifically speaking, the processor 119 acquires an unused logical chunk at the top of the free list 237C and stores the acquired logical chunk in the valid list 237A. Then, the processor 119 changes the allocation destination of the access destination virtual chunk in the deduplication mapping table 234 to the acquired unused logical chunk. The processor 119 stores association between the access destination virtual chunk and the acquired unused logical chunk in the deduplication inverse mapping table 235 and deletes association between the access destination virtual chunk and the original allocation destination logical chunk. Furthermore, the processor 119 refers to the deduplication inverse mapping table 235; and if the logical chunk associated with the access destination virtual page is allocated to another virtual page, the processor 119 continues to store that logical chunk in the valid list 237A. If the logical chunk associated with the access destination virtual page is not allocated with another virtual page, the processor 119 migrates that logical chunk from the valid list 237A to the invalid list 237B.

When storing the write data in the pool volume (or the cache area corresponding to the pool volume) in the log structuration format, the processor 119 records the correspondence relationship between the address (such as the LBA) in the virtual volume and the logical address in the pool volume in the deduplication mapping table 234 as illustrated in FIG. 8. According to the log structuration format as described earlier, when the computer node 101 updates data of a virtual chunk with new data, it writes the new data to a new logical chunk without overwriting the data of the relevant logical chunk with the new data, and changes mapping of the virtual chunk to the new logical chunk. Therefore, it is only necessary to change only the mapping of the virtual chunk to which the data has been written, and it is unnecessary to change mappings of other virtual chunks which refer to the same logical chunk as the virtual chunk to which the data has been written.

Furthermore, the processor 119 records the correspondence relationship between the logical address in the pool volume and the address (such as the LBA) in the virtual volume in the deduplication inverse mapping table 235. Furthermore, the processor 119 updates the pool volume area control table 236 as necessary in response to updates of the deduplication log structure mapping table 233.

Next, the processor 119 secures the cache in the cache area 181 of the local system (S604). The cache securing method is the same as the method explained with reference to FIG. 10.

Next, the processor 119 writes the write data in the cache area secured in S604 (S605).

The flowchart of the synchronous write processing has been explained above. Incidentally, the distributed storage system according to this embodiment can be configured so that a redundant code is generated between a plurality of computer nodes 101 by using a known technique such as Erasure Coding and the generated redundant code is stored in the computer nodes 101. In this case, it is necessary to transmit either one or both of (1) part or whole of the write data and (2) the redundant code generated from the write data, to the external system node during the synchronous write processing. As a result, even if a failure occurs at the computer node 101, the user data can be restored.

Figure 12:
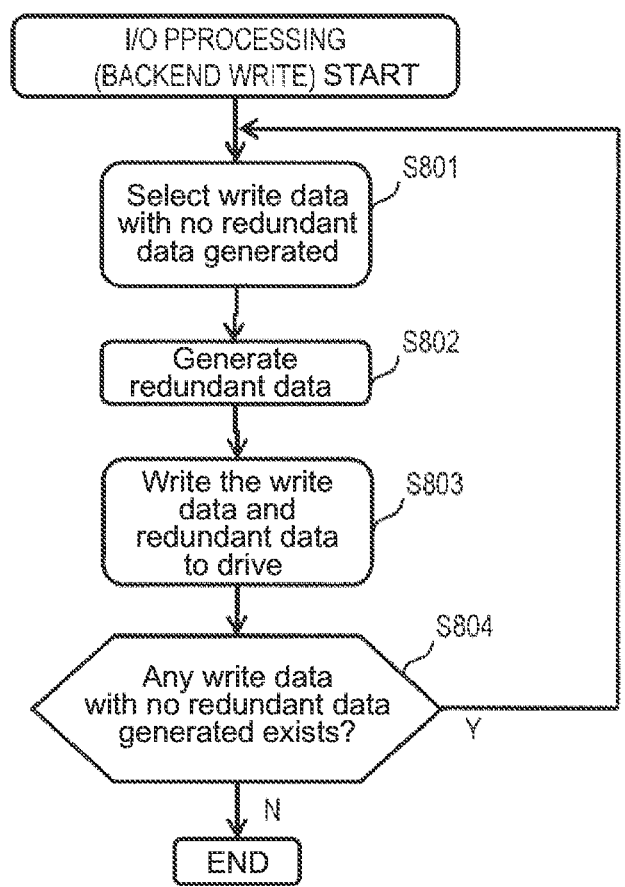
FIG. 12 illustrates a flowchart of backend write processing.

FIG. 12 illustrates a flowchart of backend write processing. This processing is executed asynchronously with the host I/O when host dirty data, that is, write data for which no redundant code has been generated, exists in the cache 181. This processing is to generate the redundant code corresponding to the write data and then write the write data and the generated redundant code to the drive (113). Under this circumstance, it is assumed for ease of explanation that the size of the write data is equal to a stripe size. Incidentally, the host dirty data is managed by the dirty queue.

After this processing is started, the processor 119 selects write data for which no redundant code has been generated (S801). The selected write data will be referred to as the relevant write data. Next, the processor 119 generates the redundant code corresponding to the relevant write data (S802). Next, the processor 119 writes the relevant write data and the generated redundant code to the drive (113) (S803). Subsequently, the processor 119 judges whether any write data for which no redundant code is generated exists or not (S804). If the judgment result is affirmative (S804: Y), the processor 119 proceeds to S801; and if the judgment result is negative (S804: N), the processor 119 terminates this processing.

FIG. 13A illustrates a flowchart of deduplication processing. During this processing, target data of the deduplication, that is, the node deduplication, the site deduplication, and the geo-deduplication is decided and each deduplication is executed on the target data. Also during this processing, target data of the deduplication cancellation, that is, the node deduplication cancellation, the site deduplication cancellation, and the geo-deduplication cancellation is decided and each deduplication cancellation is executed on the target data.

This processing is activated asynchronously with the host I/O. For example, this processing may be activated at a timing designated by the user or at a predetermined timing. Examples of the timing to be employed include: the timing when the user designates start of the processing; the timing at each specified cycle; and the timing when the amount of new write data exceeds a specified amount. Moreover, this processing is executed by the plurality of computer nodes 101 in cooperation with each other.

Referring to FIG. 13A, the processor 119 for a computer node 101 with a predetermined node number determines a master node (S9001). The master node is a computer node 101 which controls the processing during the deduplication processing in FIG. 13A in which the plurality of computer nodes 101 cooperatively operate. The master node is an arbitrary one of the computer nodes 101 in the distributed storage system. The computer nodes 101 other than the master node in the distributed storage system are slave nodes. The slave node operates by receiving instructions from the master node. The master node also serves the role as a slave node.

In S9002 to S9006, the FPT 231 is updated. Specifically speaking, an entry (row) corresponding to an updated area of the virtual volume is registered in the FPT 231 and an entry (row) corresponding to an old FP is deleted from the FPT 231.

The processor 119 for the master node issues an instruction to one of the slave nodes to create the FPT update log 239 (S9002).

The processor 119 (which will be referred to as the relevant processor) for the slave node which has received the instruction (which will be referred to as the relevant node) identifies the updated area of the virtual volume (S9003). Specifically speaking, the relevant processor executes the following processing (1) and (2). (1) The relevant processor refers to the page mapping table 215 and identifies an entry regarding which the node number column of the page mapping table 215 is the relevant node. This means that data in an area of the virtual volume corresponding to the relevant entry is allocated to the relevant node. (2) The relevant processor executes the following processing (2-1) to (2-2) on each identified entry.

(2-1) The relevant processor refers to the "state" of a virtual chunk in the deduplication mapping table 234 corresponding to the relevant entry and judges whether the relevant virtual chunk has been updated since the last execution of the deduplication processing in FIG. 13A (which will be referred to as Judgment A). (2-2) If the judgment result of Judgment A is affirmative (YES), the relevant processor identifies the area of the virtual volume corresponding to the relevant entry as the updated area. As a result of the processing (2-1) and (2-2), the relevant processor identifies the updated area(s) (updated virtual chunk(s)) of one or more virtual volumes.

Next, the relevant processor creates the FPT update log 239 on the basis of the information about the identified updated area(s) of the virtual volume(s) (S9004). Specifically speaking, the relevant processor executes the following processing (1) and (2) on each of the updated areas of the virtual volumes identified in S9003. One of the updated areas which is a target of the processing will be referred to as the relevant virtual chunk.

(1) The relevant processor reads data of the relevant virtual chunk, calculates the FP of the read data, and stores the calculated FP, together with the address (the virtual volume number, the LBA, and the address range) and the "operation" of the relevant virtual chunk, in the FPT update log 239 in the relevant node. Under this circumstance, the value of the "operation" is "registration." The address is the "information for identifying the virtual chunk." (2) The relevant processor reads the "FP" value of the deduplication mapping table 234 corresponding to the relevant virtual chunk and stores the read FP, together with the address (the virtual volume number, the LBA, and the address range) and the "operation" of the relevant virtual chunk, in the FPT update log 239 in the relevant node. Under this circumstance, the value of the "operation" is "deletion." The address is the "information for identifying the virtual chunk."

The combination of the "FP" and the "information for identifying the virtual chunk" which are stored in the FPT update log 239 of the relevant node during the above-described processing (1) is the entry that should be registered in the FPT 231 of the distributed storage system. The combination of the "FP" and the "information for identifying the virtual chunk" which are stored in the FPT update log 239 of the relevant node during the above-described processing (2) is the entry that should be deleted from the FPT 231 of the distributed storage system.

The processor 119 for the master node judges whether the instruction to create the FPT update log 239 has been executed on all the slave nodes or not (S9005). If the judgment result is affirmative (S9005: Y), the processor 119 proceeds to S9006; and if the judgment result is negative (S9005: N), the processor 119 proceeds to S9002 and executes the instruction on the next slave node.

Incidentally, since the processing in S9003 and S9004 is executed on the plurality of different computer nodes 101, the processing may be executed in parallel. In this case, the master node needs to wait until the processing in S9003 and S9004 is completed at all the slave nodes.

Next, the processor 119 for the master node issues an instruction to one of the slave nodes (the relevant slave node) to transmit the FPT update log (S9006).

Subsequently, the computer nodes 101 transmit and receive the FPT update log (S9007). Specifically speaking, the computer nodes 101 execute the following processing (1) to (3).

(1) The relevant slave node which has received the instruction from the master node divides the FPT update log 239 stored in the relevant slave node. Since a specific method is the same as the "method for dividing the FPT 231 into a plurality of partial tables" in the explanation of the structure example of the FPT 231 in FIG. 7A, an explanation about it has been omitted. However, when dividing the FPT update log 239, it is necessary to use the FP of the FPT update log 239 instead of the FP of the FPT 231. The node where the divided FPT update logs (which will be referred to as the partial FPT update logs) are stored (corresponding to the node where the divided FPT 231 is located in the explanation of FIG. 7A) will be referred to as the node in charge. Regarding a method for determining the storage node (such as the "FP value % N" in the explanation of FIG. 7A), it is necessary to employ the same method to "divide the FPT 231" and to "divide the FPT update log 239." Since the data structure of the partial FPT update log is the same as that of the FPT update log 239, the partial FPT update log will be sometimes referred to as the partial FPT update log 239.

(2) The relevant slave node transmits each partial FPT update log 239 created by the processing (1) to the corresponding node in charge.

(3) Each node in charge receives the partial FPT update log 239 transmitted in (2).

Incidentally, the processing (2) and (3) is executed by the processor 119 for each computer node 101 in accordance with instructions of the master node.

Next, the node in charge which has received the partial FPT update log 239 (the relevant node in charge) updates the FPT 231 on the basis of the received partial FPT update log 239 (which will be referred to as the relevant partial FPT update log 239) (S9008). Specifically speaking, the relevant node in charge executes the following processing (1) to (3).

(1) The relevant node in charge executes the following processing on each row in which the value of the "operation" (the "operation" in FIG. 7B) is "deletion" (which will be referred to as the relevant FPT update log entry) from among entries included in the relevant partial FPT update log 239. Specifically speaking, the relevant node in charge deletes a row in which the FP value of the FPT 231 is equal to the FP value of the relevant FPT update log, from among the rows of the FPT 231 in the relevant node in charge.

(2) The relevant node in charge executes the following processing on each row in which the value of the "operation" (the "operation" in FIG. 7B) is "registration" (which will be referred to as the relevant FPT update log entry) from among entries included in the relevant partial FPT update log 239. Specifically speaking, the relevant node in charge adds a new row, which is created based on the content of the relevant FPT update log entry, to the FPT 231 in the relevant node in charge. Under this circumstance, the "FP," "virtual volume number," "LBA," and "address range" of the new row are equal to the FP," "virtual volume number," "LBA," and "address range" of the relevant FPT update log entry, respectively.

(3) The node in charge deletes the relevant partial FPT update log 239.

Next, the master node judges whether the instruction to transmit the FPT update log 239 has been executed on all the slave nodes (S9009). If the judgment result is affirmative (S9009: Y), the master node proceeds to S9010; and if the judgment result is negative (S9009: N), the master node proceeds to S9006 and executes the instruction on the next slave node.

Incidentally, since the processing in S9007 and S9008 is executed on the plurality of different computer nodes 101, the processing may be executed in parallel. In this case, the master node needs to wait until the processing in S9007 and S9008 is completed at all the slave nodes.

Next, the master node executes the node deduplication processing in FIG. 13B, which will be described later, on each computer node 101 (S9010). Then, the master node executes the inter-node deduplication processing in FIG. 13C which will be described later (S9011). Subsequently, the master node executes the inter-node deduplication cancellation processing in FIG. 13E which will be described later (S9012).

The performance degradation caused by the deduplication can be suppressed by firstly executing the node deduplication, which causes no increase in communications between the computer nodes 101 during the I/O processing by the execution of the deduplication, and then executing the inter-node deduplication.

Figure 13B:
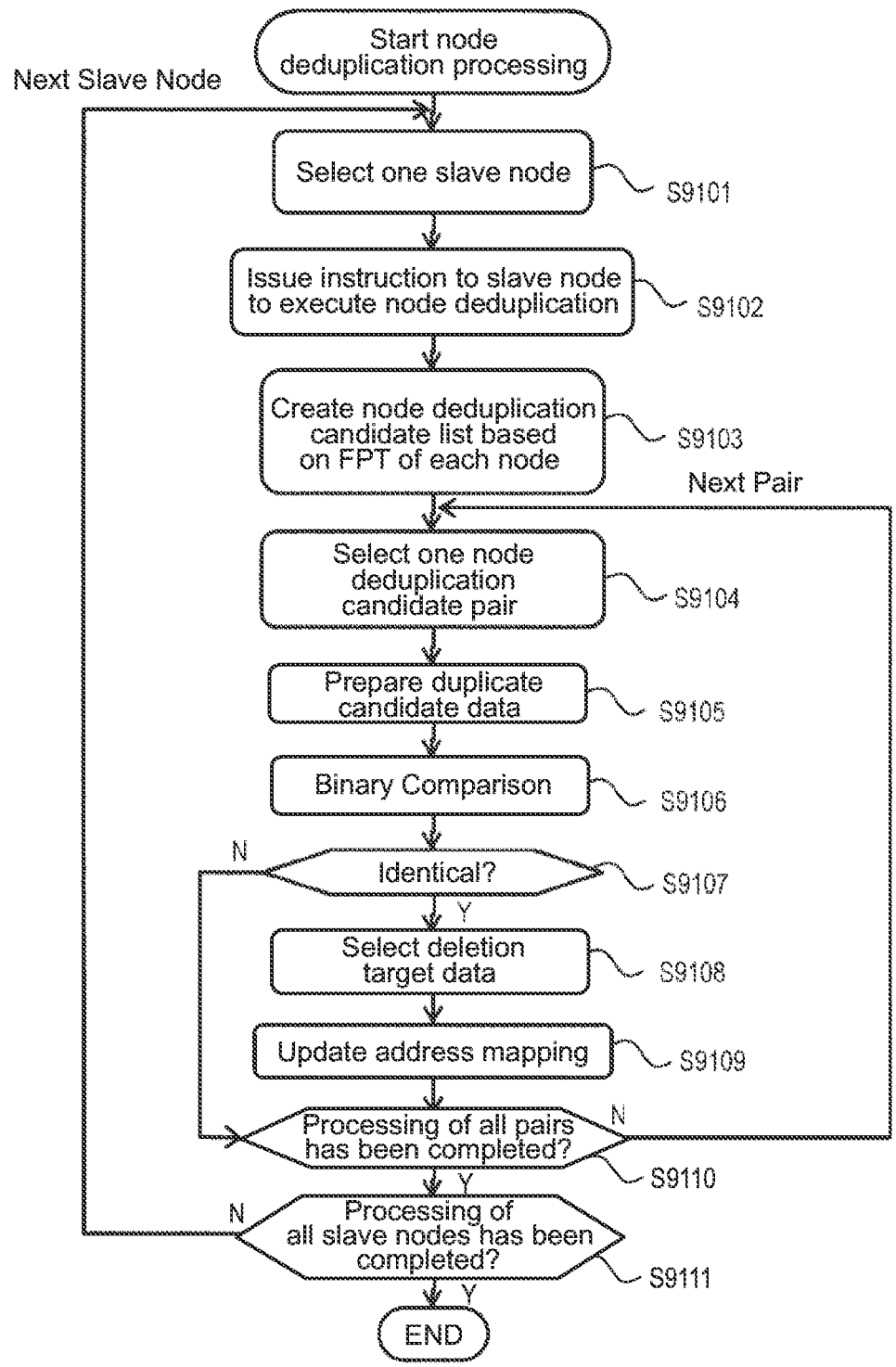
FIG. 13B illustrates a flowchart of node deduplication processing.

FIG. 13B illustrates a flowchart of the node deduplication processing. This processing is activated by the master node. This processing executes the node deduplication on duplicate data in each computer node 101.

The processor 119 for the master node firstly selects one of the slave nodes (S9101). Then, the processor 119 for the master node issues an instruction to the slave node selected in the previous step to execute the node deduplication (S9102).

Next, the processor 119 (which will be referred to as the relevant processor) for the slave node which has received the instruction to execute the node deduplication from the master node (the relevant slave node) creates a node deduplication candidate list 240 (not shown in the drawing) on the basis of the information of the FPT 231 in each computer node 101 (S9103). Specifically speaking, the relevant processor executes the following processing (1) to (5).

(1) Since the FPT 231 is distributed to, and retained by, the plurality of computer nodes 101, the relevant processor issues an instruction to each of the other computer nodes 101 (which will be referred to as the relevant node) to create part of the node deduplication candidate list 240 related to the relevant slave node.

(2) The processor 119 for the relevant node creates the node deduplication list related to the relevant slave node. Specifically speaking, the processor 119 for the relevant node extracts a row(s) in which the node number of the page mapping table 215 corresponding to the address (the virtual volume number, the LBA, and the address range) of the relevant row matches the node number of the relevant slave node, from among rows of the FPT 231 in the relevant node. A table composed of extracted rows is part of the node deduplication candidate list 240 related to the relevant slave node.

(3) The processor 119 for the relevant node transmits the part of the node deduplication candidate list 240 created in (2) to the relevant slave node.

(4) The relevant processor creates part of the node deduplication candidate list 240 related to the relevant slave node by the same processing as the above-described processing (2).

(5) The relevant processor creates the node deduplication candidate list 240 by coupling the parts of the node deduplication candidate list 240 created in the above-described steps (1) to (4). Incidentally, the data structure of the FPT 231 is the same as that of the node deduplication candidate list 240.

Next, the relevant processor selects one pair of node deduplication candidates (S9104). Specifically speaking, the relevant processor selects one pair of rows whose "FP" values are equal to each other, from among the rows of the node deduplication candidate list 240.

Then, the relevant processor prepares duplicate candidate data (S9105). Specifically speaking, the relevant processor reads a pair of the duplicate candidate data from the area of the virtual volume corresponding to each row, with respect to each row included in the pair selected in S9104, to the cache 181.

Subsequently, the relevant processor executes binary comparison of the duplicate candidate data and judges whether the content of the duplicate candidate data pair completely matches each other or not (S9106). Specifically speaking, the relevant processor compares the duplicate candidate data pair, which was read to the cache 181 in S9105, on a byte-by-byte basis and judges whether the content of the duplicate candidate data pair completely matches each other or not.

Next, in S9107, if the judgement result of S9106 is affirmative (S9107: Y), the relevant processor proceeds to S9108; and if the judgment result is negative (S9107: N), the relevant processor proceeds to S9110.

Then, the relevant processor selects one of the duplicate data corresponding to the pair selected in S9104 (corresponding to two rows in the node deduplication candidate list 240) as deletion target data (S9108).

Subsequently, the relevant processor updates the address mapping corresponding to the data selected as the deletion target data in the previous step (S9109). Specifically speaking, the relevant processor executes the following (1) to (4).

(1) The relevant processor identifies the mapping of the deduplication mapping table 234 to be updated on the basis of the address (the virtual volume number, the LBA, and the address range) of the virtual volume included in the row in the node deduplication candidate list 240 corresponding to the data selected as the deletion target data in the previous step (S9108).

(2) The relevant processor identifies the address (the pool volume number, LBA, the address range) of a pool volume which is a mapping destination, by searching the deduplication mapping table 234 by using, as a key, the address (the virtual volume number, the LBA, and the address range) included in the row in the node deduplication candidate list 240 corresponding to the data which was not selected as the deletion target data in the previous step (S9108).

(3) The relevant processor updates the mapping identified in the above-described step (1) so that the mapping destination will become the address of the pool volume identified in the above-described step (2). Furthermore, the relevant processor updates the deduplication inverse mapping table 235 to add inverse mapping to map from the address of the pool volume identified in the above-described step (2) to the address of the virtual volume in the above-described step (1).

(4) The relevant processor updates the value of the pool volume area amount table 238 as necessary along with the update of the table in the above-described step (3).

Next, the relevant processor judges whether the processing regarding all node deduplication candidate pairs has been completed or not. If the judgment result is affirmative (S9110: Y), the relevant processor proceeds to S9111; and if the judgment result is negative (S9110: N), the relevant processor proceeds to S9104 and executes the processing on the next node deduplication candidate pair.

Then, the master node judges whether the processing on all the slave nodes has been completed or not. If the judgment result is affirmative (S9111: Y), the master node terminates the node deduplication processing. If the judgment result is negative (S9111: N), the master node proceeds to S9101 and selects the next slave node.

The inter-node deduplication processing and the inter-node deduplication cancellation processing in steps S9011 and S9012 of FIG. 13A will be explained below; and the aforementioned "data unit(s)" will be used with respect to these processing sequences. Although a virtual chunk(s) or a virtual page(s) can be used as the "data unit(s)," the case where a virtual chunk(s) is used as the "data unit(s)" will be explained in the following description.

Figure 13C:
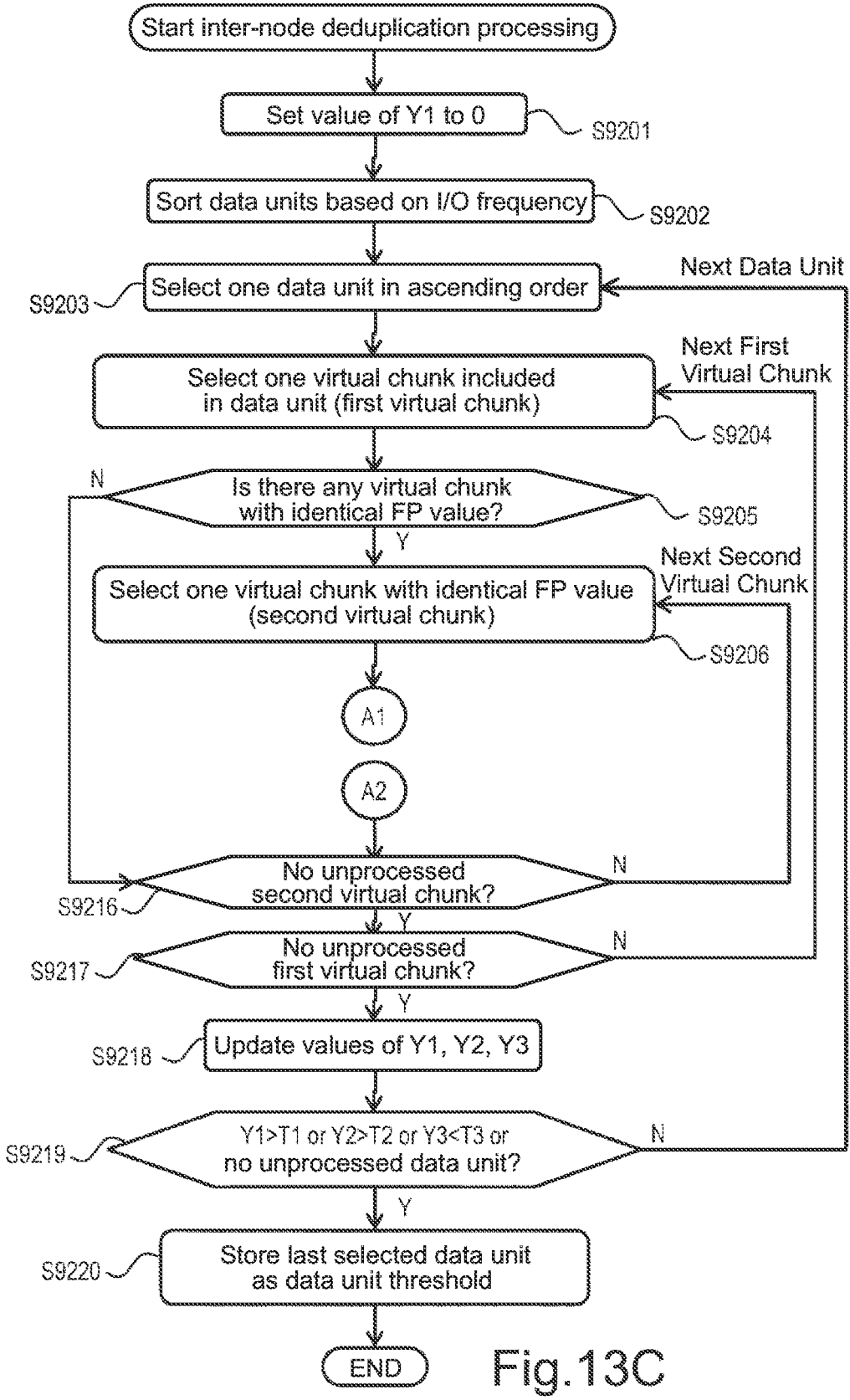
FIG. 13C illustrates a flowchart of inter-node deduplication processing.
Figure 13D:
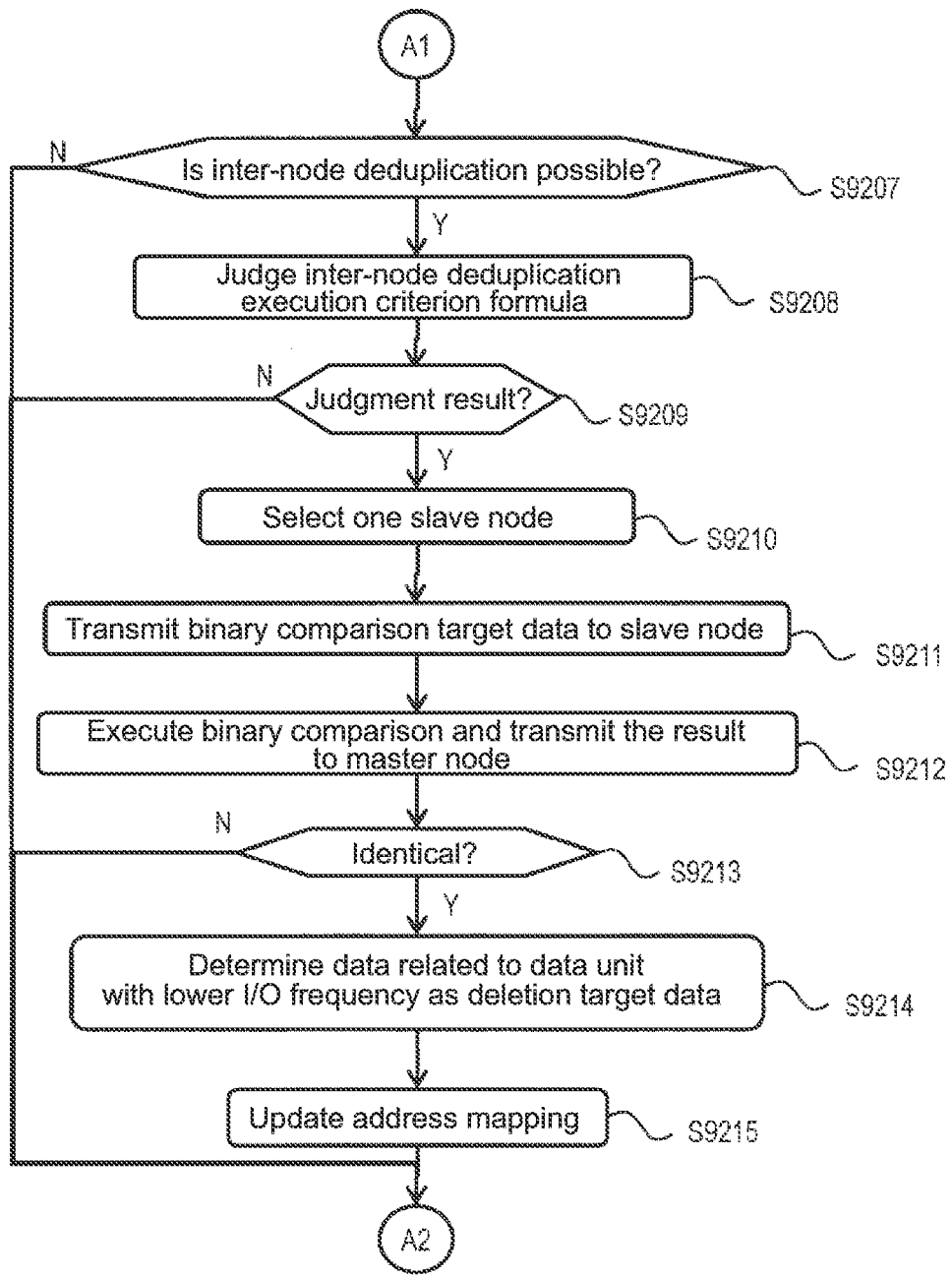
FIG. 13D illustrates a continued part of the flowchart of the inter-node deduplication processing.

FIG. 13C and FIG. 13D illustrate flowcharts of the inter-node deduplication processing. This processing is executed by the master node and the slave node. This processing is to execute the inter-node deduplication (the site deduplication or the geo-deduplication) on duplicate data stored in different computer nodes 101 in the distributed storage system. The information used to judge whether to execute the inter-node deduplication includes at least one of variables Y1, Y2, Y3. Under this circumstance, the variables Y1, Y2, Y3 are a "predicted value of network load caused by the inter-node duplicate data reading which occurs as a result of the inter-node deduplication," a "predicted value of average response time of the distributed storage system," and a "predicted value of average throughput of the distributed storage system," respectively.

Incidentally, FIG. 13C and FIG. 13D include a case where the master node refers to the various kinds of tables stored in the master node and a case where the master node refers to or updates the various kinds of tables stored in a node(s) other than the master node. In the former case, the master node does not have to communicate with another computer node 101; however, in the latter case, the master node needs to request that the other computer node 101 refer to, or update, the tables. However, for ease of explanation in the following description, it will be simply stated in both the former case and the latter case that "the processor 119 for the master node refers to (or updates) the XX table."

The processor 119 for the master node firstly sets the value of the variable Y1 to 0 (S9201).

Next, the processor 119 for the master node sorts data units in ascending order of the I/O frequency (S9202). Specifically speaking, the processor 119 for the master node creates copies of the virtual chunk load frequency table 225 and sorts the copied tables in ascending order of the I/O frequency.

Then, the processor 119 for the master node selects one data unit in ascending order of the I/O frequency (S9203). Specifically speaking, the processor 119 for the master node selects one row in ascending order of the I/O frequency from the table sorted in S9202. The selected data unit will be referred to as the relevant data unit.

Subsequently, the processor 119 for the master node selects one virtual chunk included in the relevant data unit (S9204). Since a "virtual chunk" is defined as the "data unit" here, the virtual chunk to be selected is the virtual chunk itself corresponding to the row selected in S9203. The virtual chunk selected in S9204 will be referred to as the relevant first virtual chunk.

Next, the processor 119 for the master node judges whether any virtual chunk which has the same FP value as the FP value of the relevant first virtual chunk exists or not (S9205). Specifically speaking, the processor 119 for the master node executes the following processing (1) to (3).

(1) The processor 119 for the master node identifies the FP value of data of the relevant first virtual chunk by referring to the FP of the deduplication mapping table 234 corresponding to the relevant first virtual chunk. The identified FP value will be referred to as the relevant FP value.

(2) The processor 119 for the master node refers to the FPT 231 in the node in charge of the relevant FP value (which will be referred to as the relevant node in charge) and judges whether an entry with the relevant FP value (however, an entry different from the entry corresponding to the relevant first virtual chunk) exists or not. Under this circumstance, the node number corresponding to the relevant node in charge is determined by using the same method as the method used in the explanation of FIG. 7A such as the determination method based on the calculation formula like the "FP value % N."

(3) If the judgment result is affirmative in the above-described step (2), the processor 119 for the master node determines that the judgment result of S9205 is affirmative (S9205: Y), and the processor 119 proceeds to S9206; and if the judgment result in the above-described step (2) is negative, the processor 119 for the master node determines that the judgment result of S9205 is negative (S9205: N), and the processor proceeds to S9216.

Next, the processor 119 for the master node selects one virtual chunk in which data with the same FP value as the FP value of data of the first virtual chunk is stored (which will be referred to as the relevant second virtual chunk) (S9206). Specifically speaking, the processor 119 for the master node executes the following processing (1) and (2). (1) The processor 119 for the master node refers to the FPT 231 in the node in charge of the relevant FP value (which will be referred to as the relevant node in charge) and identifies an entry with the relevant FP value (however, an entry different from the entry corresponding to the relevant first virtual chunk). (2) The processor 119 for the master node selects one entry from the identified entry. A virtual chunk corresponding to the selected entry is the relevant second virtual chunk.

Next, the processor 119 for the master node judges whether or not the inter-node deduplication can be executed between the relevant first virtual chunk and the relevant second virtual chunk (S9207). Specifically speaking, the processor 119 for the master node executes the following processing (1) to (3).

(1) The processor 119 for the master node refers to the deduplication mapping table 234 and identifies a pool volume corresponding to the relevant first virtual chunk, and then refers to the pool volume management table 219 and identifies the computer node 101 corresponding to the identified pool volume.

(2) The processor 119 for the master node executes the same processing as the above-described processing (1) on the relevant second virtual chunk and identifies a computer node 101 corresponding to the pool volume corresponding to the relevant second virtual chunk.

(3) If the computer node 101 identified in the above-described processing (1) is not the same as the computer node 101 identified in the above-described processing (2), the processor 119 for the master node determines that the judgment result of S9207 is affirmative, and proceeds to S9208. Otherwise, the processor 119 for the master node determines that the judgment result of S9207 is negative, and proceeds to S9216.

Next, before explaining about the step S9208, a necessary concept for processing for updating the deduplication effect management table 232 which is executed in step S9208 will be explained. The deduplication effect management table 232 is a table for managing how many logical chunks with a certain FP have been deduplicated by means of the node deduplication, the site deduplication, and the geo-deduplication, respectively, in the distributed storage system as described earlier. In order to update an entry in this table, information about inverse mappings of the deduplication inverse mapping table 235 is used. An inverse mapping of the deduplication inverse mapping table 235 associates one or more vertical chunks with one logical chunk (corresponding to the data 250 in FIG. 8) (however, when the relevant logical chunk is a valid logical chunk).

The inverse mapping regarding a valid logical chunk in the deduplication inverse mapping table 235 is classified into either one of the following two types. Specifically speaking, the two type are: (1) a main inverse mapping and (2) a subsidiary inverse mapping. (1) The main inverse mapping is designed so that one inverse mapping is always associated with a valid logical chunk and this inverse mapping does not contribute to a data amount reduction by the deduplication (the node deduplication, the site deduplication, or the geo-deduplication). (2) The subsidiary inverse mapping is designed so that zero or more inverse mappings are associated with a valid logical chunk and this inverse mapping contributes to the data amount deduction by the deduplication (the same as mentioned above). The main inverse mapping is an inverse mapping created when a logical chunk is allocated to a virtual chunk as a result of writing of data; and the subsidiary inverse mapping is an inverse mapping created when a plurality of virtual chunks are associated with one logical chunk as a result of the deduplication. However, the inverse mapping which is created as triggered by writing does not necessarily have to be selected as the main inverse mapping. When a plurality of inverse mappings are associated with a valid logical chunk, any one of the plurality of inverse mappings can be selected as the main inverse mapping.

The above-described type (2) subsidiary inverse mapping can be further reclassified into any one of the following three types. The three types are: (2-1) a node subsidiary inverse mapping. (2-2) a site subsidiary inverse mapping, and (2-3) a geo subsidiary inverse mapping. These types (2-1) (2-2) (2-3) are subsidiary inverse mappings related to the node deduplication, the site deduplication, and the geo-deduplication, respectively.

Under this circumstance, a computer node 101 corresponding to a certain logical chunk (which will be referred to as the relevant logical chunk) (the computer node 101 corresponding to the relevant logical chunk can be identified by referring to the pool volume management table 219 on the basis of the pool volume number corresponding to the relevant logical chunk) will be referred to as the first node; and a computer node 101 corresponding to a certain virtual chunk (which will be referred to as the relevant virtual chunk) (the computer node 101 corresponding to the relevant virtual chunk can be identified by referring to the page mapping table 215 on the basis of the virtual volume number corresponding to the relevant virtual chunk) will be referred to as the second node. A certain subsidiary inverse mapping (which will be referred to as the relevant subsidiary inverse mapping) associates the relevant logical chunk with the relevant virtual chunk. When the first node and the second node are the same node, the relevant subsidiary inverse mapping is a node subsidiary inverse mapping. When the first node and the second node are different nodes and the first node and the second node are in the same site, the relevant subsidiary inverse mapping is a site subsidiary inverse mapping. Furthermore, when the first node and the second node are different nodes and the first node and the second node are not in the same site, the relevant subsidiary inverse mapping is a geo subsidiary inverse mapping.

A row of the deduplication effect management table 232 (which will be referred to as the relevant row) can be set by the following method. Specifically speaking, when a computer node 101 related to the relevant row is called the relevant node and an FP related to the relevant row is called the relevant row FP, the "number of node deduplication reductions," the "number of site deduplication reductions," and the "number of geo-deduplication reductions" of the deduplication effect management table 232 are equal to a total number of node subsidiary inverse mappings, a total number of site subsidiary inverse mappings, and a total number of geo subsidiary inverse mappings, respectively, which are related to a logical chunk having the same FP as the relevant row FP in the relevant node.

Returning to the explanation of step S9208, the processor 119 for the master node judges the inter-node deduplication execution criterion formula in step S9208. This step corresponds to the judgment method explained about the "Judgment Method (2) for Executing Inter-Node Deduplication" in FIG. 1. Specifically speaking, the processor 119 for the master node executes the following processing (1) and (2).

(1) The processor 119 for the master node updates the row of the deduplication effect management table 232 corresponding to the relevant FP value (the relevant row). Specifically speaking, the processor 119 for the master node sets the total number of node subsidiary inverse mappings, the total number of site subsidiary inverse mappings, and the total number of geo subsidiary inverse mappings which are associated with the logical chunk corresponding to the relevant FP in the distributed storage system to the "number of node deduplication reductions," the "number of site deduplication reductions," and the "number of geo-deduplication reductions," respectively, in the relevant row. Incidentally, the processor 119 for the master node needs to request that the other computer nodes 101 should refer to, and update, the table as necessary.

(2) Under this circumstance, r represents the "number of node deduplication reductions" in the relevant row of the above-mentioned processing (1). The processor 119 for the master node evaluates the inter-node deduplication execution criterion formula indicated below. If the judgment result is affirmative, the processor 119 for the master node determines that the judgment result of S9208 is affirmative. If the judgment result is negative, the processor 119 for the master node determines that the judgment result of S9208 is affirmative.

r<"Threshold for Inter-Node Deduplication Execution Criterion Formula"  Inter-Node Deduplication Execution Criterion Formula Incidentally, the "threshold for the inter-node deduplication execution criterion formula" is a predetermined value and that information is stored in the memory 118 (not shown in the drawing).

Next, in step S9209, if the judgement result of S9208 is affirmative, the processor 119 for the master node proceeds to S9210; and if the judgment result of S9208 is negative, the processor 119 for the master node proceeds to S9216. In steps S9210 to S9215, the inter-node deduplication (the site deduplication or the geo-deduplication) may sometimes be executed.

Then, the processor 119 for the master node selects one computer node 101 as a slave node (S9210). The selected computer node 101 will be referred to as the relevant slave node. If the relevant slave node is a computer node 101 in which a logical chunk corresponding to the relevant first virtual chunk or the relevant second virtual chunk is stored, a data transfer amount in S9211 can be reduced.

Subsequently, the processor 119 for the master node issues an instruction to the computer node 101, in which the logical chunk corresponding to the relevant first virtual chunk (which will be referred to as the relevant first logical chunk) is stored, to transmit data in the relevant first logical chunk to the relevant slave node and also issues an instruction to the computer node 101, in which the logical chunk corresponding to the relevant second virtual chunk (which will be referred to as the relevant second logical chunk) is stored, to transmit data in the relevant second logical chunk to the relevant slave node; and the computer node 101 which has received the instruction transmits the data in accordance with the instruction (S9211).

Next, the relevant slave node executes binary comparison and transmits the result to the master node (S9212). Specifically speaking, the relevant slave node compares the data in the relevant first logical chunk with the data in the relevant second logical chunk on a byte-by-byte basis and judges whether the content of these pieces of data completely match each other. The relevant slave node transmits the judgment result ("identical" or "non-identical") to the master node.

Then, if the judgment result of S9212 is "identical," the processor 119 for the master node proceeds to S9214; and if the judgment result of S9212 is "non-identical," the processor 119 for the master node proceeds to S9214 (S9213).

Subsequently, the processor 119 for the master node determines data related to a data unit with a smaller I/O frequency as deletion target data (S9214). Specifically speaking, the processor for the master node identifies the I/O frequency of the relevant first virtual chunk and the relevant second virtual chunk on the basis of the virtual chunk load frequency table 225 and determines a logical chunk corresponding to the virtual chunk with smaller I/O frequency as the deletion target data.

Incidentally, in S9214, the I/O frequency of the virtual chunk corresponding to the relevant first virtual chunk and the I/O frequency of the virtual chunk corresponding to the relevant second virtual chunk may be identified on the basis of the page load frequency table 216 and a logical chunk corresponding to a virtual page with smaller I/O frequency may be determined as the deletion target data.

Next, the processor 119 for the master node updates the address mapping corresponding to the data which was determined as the deletion target data in S9214 (S9215). A specific method is the same as in S9109.

Furthermore, in S9215, the processor 119 for the master node sets an invalid value to the "inter-node duplicate data reading frequency" of the virtual chunk load frequency table 225 with respect to the virtual chunk corresponding to the deletion target data.

Next, the processor 119 for the master node judges whether there is any unprocessed second virtual chunk (S9216). If the judgment result is affirmative (S9216: Y), the processor 119 for the master node proceeds to S9217; and if the judgment result is negative (S9216: N), the processor 119 for the master node proceeds to S9206.

Then, the processor 119 for the master node judges whether there is any unprocessed first virtual chunk (S9217). If the judgment result is affirmative (S9217: Y), the processor 119 for the master node proceeds to S9218; and if the judgment result is negative (S9217: N), the processor 119 for the master node proceeds to S9204.

Subsequently, the processor 119 for the master node updates the values of Y1, Y2, Y3 (S9218). Specifically speaking, the processor 119 for the master node executes the following processing (1) to (3).

(1) This processing is to update the "network load Y1 caused by the inter-node duplicate data reading which occurs when the inter-node deduplication is executed." The processor 119 for the master node updates Y1 according to the following calculation formula.

$$\text{"Y1"} \leftarrow \text{"Y1"} + \text{"δ"} \quad \text{Calculation Formula}$$

In this calculation formula, "δ" represents the "predicted value of the I/O frequency of the inter-node duplicate data reading related to the data unit selected in S9203." The "inter-node duplicate data reading frequency" of the virtual chunk load frequency table 225 with respect to the data unit selected in S9203 can be used as the value of "δ." However, when the "inter-node duplicate data reading frequency" of the virtual chunk load frequency table 225 is an invalid value, the value of the I/O frequency (access frequency) regarding reading which is managed by the virtual chunk load frequency table 225 can be used as the value of "δ." Under this circumstance, the I/O frequency is the I/O frequency regarding the data unit selected in S9203. In this case, the value of "δ" is an approximate value of the inter-node duplicate data reading frequency.

(2) The processor 119 for the master node calculates Y2 according to the following calculation formula and the calculated value is set to Y2.

$$\text{"Y2"} = (\Sigma_{i=1 \text{ to } N} W_i \times R_i) + (\Sigma_{i=N+1 \text{ to } M} W_i \times R_a) \text{ (where } N<M\text{)}$$

$$\text{"Y2"} = (\Sigma_{i=1 \text{ to } N} W_i \times R_i) \text{ (where } N=M\text{)}$$

$$W_i = L_i \div (\Sigma_{i=1 \text{ to } M} L_i) \quad \text{Calculation Formula}$$

$R_i = R_a$ (in a case of Case (a) described later)
$R_i = R_{ib}$ (in a case of Case (b) described later)
$R_i = R_c$ (in a case of Case (c) described later)
$R_a$ = "standard response time when accessing data in a computer node 101"
$R_b$ = "standard response time when accessing data across different computer nodes 101 within the site"
$R_c$ = "standard response time when accessing data across computer nodes 101 within different sites"

In this calculation formula, Σ is a mathematical symbol representing calculation of summation. The letter "i" represents the row number in the table sorted in S9202 (which will be referred to as the relevant table). "N" represents the number indicating in which row in the relevant table the relevant data unit is located. "M" represents a number indicating the total number of rows in the relevant table. $R_i$ represents response time (average response time) of the relevant data unit. $W_i$ represents weight of the response time of the relevant data unit (incidentally, when the denominator of the calculation formula for $W_i$ is 0, the value of $W_i$ is 0). $L_i$ represents the I/O frequency of the relevant data unit. The values of $R_i$ and $L_i$ are identified according to the virtual chunk load frequency table 225.

Next, "Case (a) to Case (c)" will be explained. Under this circumstance, a computer node 101 corresponding to the relevant data unit (virtual chunk in this example) (the computer node 101 identified according to the page mapping table 215) will be referred to as the first node; and a computer node 101 corresponding to a data unit (virtual chunk in this example) corresponding to the row number "i" in the relevant table (the computer node 101 identified according to the pool volume management table 219) will be referred to as the second node. Case (a) is a case where the first node and the second node are the same. Case (b) is a case where the first node and the second node are different, but the second node and the second node are in the same site. Case (c) is a case where the first node and the second node are in different sites.

$R_a$ may be a preset value or an average value of the response time of each I/O processing (I/O processing to access data in the computer node 101). $R_b$ may be a preset value or an average value of the response time of each I/O processing (I/O processing to access data across the different computer notes 101 in the site). $R_c$ may be a preset value or an average value of the response time of each I/O processing (I/O processing to access data across the different computer notes 101 in different sites).

(3) The processor 119 for the master node calculates Y3 according to a calculation formula below and sets the calculated value to Y3. Incidentally, the symbols or signs in the calculation formula below are common with those used in the calculation formula for the above-described processing (2). Furthermore, the value of Y3 may sometimes be different from an actual value of the "average throughput of the distributed storage system." Furthermore, the value of Y3 may be calculated according to a calculation formula other than the calculation formula mentioned below. For the calculation of Y3, any one of, or a combination of, the value of I/O load on each virtual chunk, the value of S below, the above-mentioned value of $R_i$, the above-mentioned value of $R_a$, the above-mentioned value of $R_b$, and the above-mentioned value of $R_c$ may be used.

$$\text{"Y3"} = (\Sigma_{i=1 \text{ to } N} W_i \times S \div R_i) + (\Sigma_{i=N+1 \text{ to } M} W_i \times S \div R_a)$$
$$\text{(where } N<M\text{)}$$

$$\text{"Y3"} = (\Sigma_{i=1 \text{ to } N} W_i \times S \div R_i) \text{ (where } N=M\text{)} \quad \text{Calculation Formula}$$

S = "data unit size"

In S9219, the processor 119 for the master node judges whether Y1 is higher than T1 (Y1>T1), or whether Y2 is higher than T2 (Y2>T2), or whether Y3 is lower than T3 (Y3<T3), or whether there is any unprocessed data unit or not. Under this circumstance, T1, T2, T3 are predetermined thresholds. The values of these thresholds may be set by the user via a management terminal of a computer node 101 (not shown in the drawing).

Incidentally, the processor 119 for the master node may judge any one of, or two combinations of, the inequality expressions "Y1>T1," "Y2>T2," and "Y3<T3" (it is necessary to judge "whether there is any unprocessed data unit or not").

The influence on the I/O load (the "network load caused by the inter-node duplicate data reading," the "average response time," or the "average throughput") can be suppressed to within a certain range by limiting the data unit on which the inter-node deduplication is executed, on the basis of the judgment in S9219.

In S9220, the processor 119 for the master node stores the data unit, which was selected last in S9203, as the data unit threshold (corresponding to P in FIG. 1).

The flowchart of the inter-node deduplication processing has been explained above. As a result of the inter-node deduplication, the inter-node deduplication can be applied to only the data unit with a low I/O load.

Figure 13E:
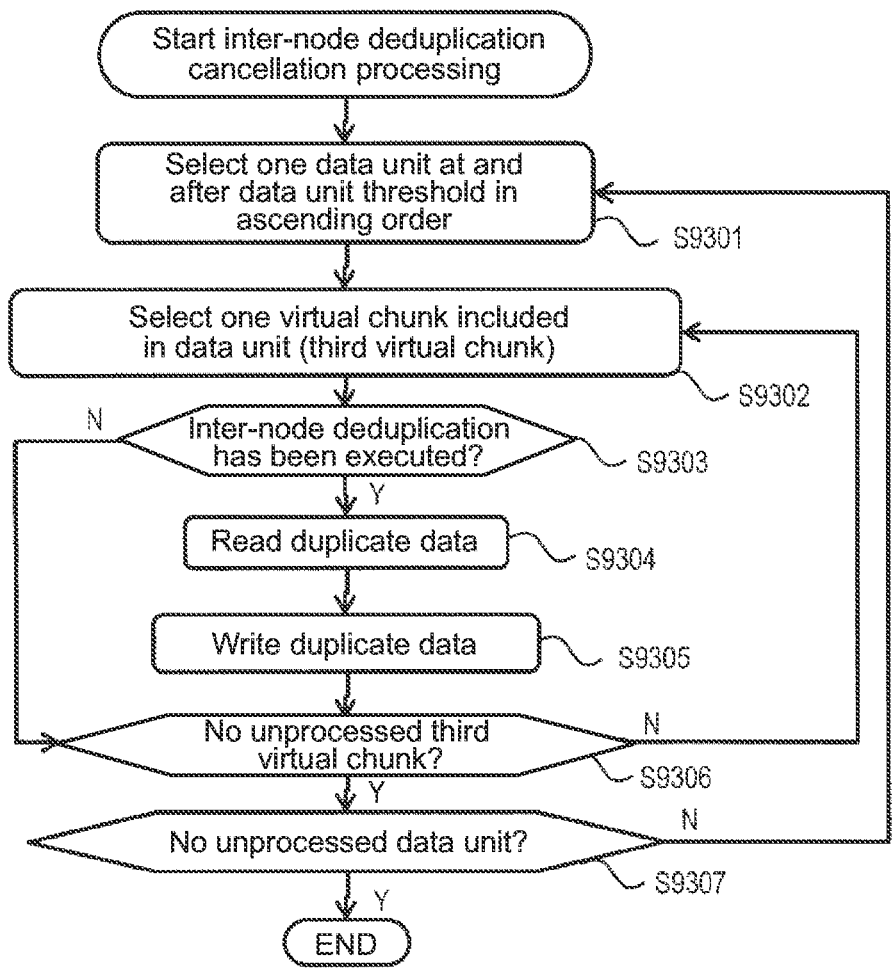
FIG. 13E illustrates a flowchart of inter-node deduplication cancellation processing.

FIG. 13E illustrates a flowchart of the inter-node deduplication cancellation processing. This processing is to cancel the inter-node deduplication with respect to a virtual chunk(s) on which the judgment is made that the inter-node deduplication should not be executed.

In S9301, the processor 119 for the master node selects one data unit at and after the data unit threshold in ascending order. Specifically speaking, the processor 119 for the master node selects one row which is or below the row corresponding to the data unit threshold stored in S9220 in ascending order of the I/O frequency, from among rows of the table sorted in S9202. The selected data unit will be referred to as the relevant data unit.

In S9302, the processor 119 for the master node selects one virtual chunk included in the relevant data unit. Since a "virtual chunk" is defined as the "data unit" here, the virtual chunk to be selected is the virtual chunk itself corresponding to the row selected in S9301. The virtual chunk selected in S9302 will be referred to as the relevant third virtual chunk.

In S9303, the processor 119 for the master node judges whether the inter-node deduplication has been executed on the relevant third virtual chunk or not.

Specifically speaking, the processor 119 for the master node firstly identifies a computer node 101 corresponding to the relevant third virtual chunk (a computer node 101 which is identified according to the page mapping table 215 and corresponds to the relevant third virtual chunk) as Node A.

Next, the processor 119 for the master node identifies a computer node 101 in which a logical chunk corresponding to the relevant virtual chunk (which will be referred to as the relevant logical chunk) is stored as Node B. Specifically speaking, the processor 119 for the master node firstly identifies a pool volume corresponding to the relevant virtual chunk from the deduplication mapping table 234, then identifies a computer node 101 corresponding to the above-identified pool volume from the pool volume management table 219, and specifies the identified computer node 101 as Node B.

Then, the processor 119 for the master node judges whether or not Node A and Node B are different computer nodes 101 and the number of deduplication inverse mappings associated with the relevant logical chunk is 2 or more (whether or not the number of indices in the deduplication inverse mapping table 235 corresponding to the relevant logical chunk is 2 or more). If the judgment result is affirmative (S9303: Y), the processing proceeds to S9304; and if the judgment result is negative (S9303: N), the processing proceeds to S9306.

In S9304, the processor 119 for the master node reads data of the relevant third virtual chunk.

In S9305, the processor 119 for the master node writes the data, which has been read in S9304, to the relevant third virtual chunk. Since specific write processing is the same as the processing in FIG. 11, an explanation about it has been omitted.

The inter-node deduplication on the relevant third virtual chunk is canceled by steps S9304 and S9305. Incidentally, steps S9304 and S9305 may be executed at a computer node corresponding the relevant third virtual chunk (the computer node 101 specified according to the page mapping table 215) instead of the master node.

In S9306, the processor 119 for the master node judges whether there is no unprocessed third virtual chunk or not. When there is no unprocessed third virtual chunk (S9306: Y), the processing proceeds to S9307; and when there is an unprocessed third virtual chunk (S9306: N), the processing proceeds to S9302.

In S9307, the processor 119 for the master node judges whether there is no unprocessed data unit. When there is no unprocessed data unit (S9307: Y), the processor 119 terminates the inter-node deduplication cancellation processing; and when there is an unprocessed data unit (S9307: N), the processing proceeds to S9301.

The flowchart of the inter-node deduplication cancellation processing has been explained above. The inter-node deduplication cancellation can apply the inter-node deduplication cancellation to a data unit with a high I/O load. As a result, the I/O performance of the data unit with high I/O frequency can be enhanced.

Next, a variation embodiment of the present invention will be explained. In this variation embodiment, a virtual page(s) is used, instead of a virtual chunk(s), as the data unit in FIG. 13A to FIG. 13E.

One difference in this variation embodiment is that in S9202 of FIG. 13C, the page load frequency table 216 is used instead of the virtual chunk load frequency table 225. While the deduplication is performed on a virtual chunk basis, the load frequency is managed on the basis of a virtual page whose size is larger than that of a virtual chunk. Consequently, virtual-chunk-based management information such as the virtual chunk load frequency table 225 will no longer be necessary and the management information can thereby be reduced.

Another difference of this variation embodiment is that the "inter-node duplicate data reading frequency" of the page load frequency table 216 with respect to the data unit selected in S9203 is used as the value of "δ" to be used to update "Y1" in S9218. Incidentally, the I/O frequency (access frequency) about reading of the page load frequency table 216 may be used as the value of "δ." Since the value of "δ" in this variation embodiment is an approximate value of the actual value of "δ", the value of Y1 which is calculated based on the value of "δ" in this variation embodiment becomes an approximate value of the actual value of Y1. The advantage of using the page load frequency table 216 is as described earlier.

Another difference of this variation embodiment is that the values of $R_i$ and $L_i$ in S9218 are specified by the page load frequency table 216. The advantage of using the page load frequency table 216 is as described earlier.

Because of the deduplication technique of this disclosure, the inter-node deduplication can be executed while suppressing the performance degradation, and both the high data amount reduction effect and the high performance can be achieved. Furthermore, the deduplication technique can avoid the occurrence of bottlenecks caused by the network. Specifically speaking, the inter-node deduplication processing is executed after executing the node deduplication processing, so that the deduplication can be performed in ascending order of influences on the performance and, therefore, the performance degradation by the deduplication processing can be reduced. The data units are sorted in the order of the I/O frequency and the inter-node deduplication can be performed so that the influences on the performance will be curbed within a specified range in ascending order of the influences. Accordingly, the execution of the inter-node deduplication is prioritized on the data units whose influences on the I/O load are small; and both the high data amount reduction effect and the high performance can be achieved. Furthermore, both the high data amount reduction effect and the high performance can be achieved by executing the inter-node deduplication when the number of inverse mappings for mapping destinations of a judgment target data unit of the inter-node deduplication is equal to or less than a specified threshold.

Incidentally, the present invention is not limited to the aforementioned embodiments, and includes various variations. For example, the aforementioned embodiments have been described in detail in order to explain the invention in an easily comprehensible manner and are not necessarily limited to those having all the configurations explained above. Furthermore, part of the configuration of an embodiment can be replaced with the configuration of another embodiment and the configuration of another embodiment can be added to the configuration of a certain embodiment. Also, the configuration of another configuration can be added to, or deleted from, or replaced with, part of the configuration of each embodiment.

Furthermore, each of the aforementioned configurations, functions, processing units, etc. may be implemented by hardware by, for example, designing part or all of such configurations, functions, and processing units by using integrated circuits or the like. Moreover, each of the aforementioned configurations, functions, etc. may be realized by software by processors interpreting and executing programs for realizing each of the functions. Information such as programs, tables, and files for realizing each of the functions may be retained in memories, storage devices such as hard disks and SSDs, or storage media such as IC cards, and SD cards.

Furthermore, control lines and information lines which are considered to be necessary for the explanation are illustrated; however, not all control lines or information lines are necessarily indicated in terms of products. Practically, it may be assumed that almost all components are connected to each other.

REFERENCE SIGNS LIST

101: computer node
102: computer domain
106: port
111: processor package
113: disk drive
118: memory
119: processor

The invention claimed is:

1. A distributed storage system including a plurality of nodes, which are connected to each other, for controlling storage of data in a plurality of logical storage areas,
wherein the plurality of nodes: provide a host system with a virtual storage area across the logical storage areas controlled by the respective nodes; manage allocation of a plurality of virtual partial areas obtained by dividing the virtual storage area and a plurality of partial logical storage areas obtained by dividing the logical storage areas; and distribute data written to the virtual storage area and store the data in the logical storage areas;
wherein a first node among the plurality of nodes judges whether the same data as first data, which is written to a first virtual partial area managed by the first node from among the plurality of virtual partial areas, exists in a second virtual partial area managed by a second node among the plurality of nodes from among the plurality of virtual partial areas;
wherein when the same data as the first data exists in the second node, the first node executes inter-node deduplication either for changing allocation of the partial logical storage area for the first virtual partial area to the partial logical storage area for the second virtual partial area or for changing allocation of the partial logical storage area for the second virtual partial area of the second node to which the same data is written to the partial logical storage area for the first virtual partial area; and
wherein, when the first node calculates a predicted value of I/O load on the first node after execution of the inter-node deduplication of the first virtual partial area and the predicted value satisfies a predetermined condition, the first node executes the inter-node deduplication of a third virtual partial area managed by the first node from among the plurality of virtual partial areas obtained by dividing the virtual storage area.

2. The distributed storage system according to claim 1, wherein the I/O load is at least one of inter-node reading network load, average response time, and average throughput; and
wherein the predetermined condition is satisfied when the inter-node reading network load is less than a first threshold, when the average response time is less than a second threshold, or when the average throughput is more than a third threshold.

3. The distributed storage system according to claim 1, wherein the first node executes the inter-node deduplication on data stored in the first node sequentially from data in a virtual partial area with low I/O frequency.

4. The distributed storage system according to claim 1, wherein, when the first node judges whether or not the same data exists between virtual partial areas managed by the first node from among the plurality of virtual partial areas and when the same data exists, the first node executes node deduplication for aggregating allocations of the partial logical storage areas to the virtual partial areas into one of the partial logical storage areas and then executes the inter-node deduplication.

5. The distributed storage system according to claim 1, wherein, when a total sum of a deduplicated number of the first data stored in the first node and a deduplicated number of second data stored in the second node is less than a second threshold, the first node executes the inter-node deduplication of the first data and the second data.

6. The distributed storage system according to claim 1, wherein when the first node receives a read request from the host system to the first virtual partial area and when the partial logical storage area of the second node is allocated to the first virtual partial area, the first node acquires data requested by the read request from the second node and transmits the acquired data to the host system.

7. The distributed storage system according to claim 6, wherein when the first node receives a first write request for a fourth virtual partial area of the virtual storage area, the first node allocates a fourth partial logical storage area from among the plurality of partial logical storage areas and writes data requested by the first write request to the fourth partial logical storage area; and wherein when the first node receives a second write request for a fifth virtual partial area, the first node changes allocation from a first partial logical storage area to a fourth partial logical storage area from among the plurality of partial logical storage areas and writes data requested by the second write request to the fourth partial logical storage area.

8. A control method for a distributed storage system including a plurality of nodes, which are connected to each other, for controlling storage of data in a plurality of logical storage areas,
the control method for the distributed storage system, comprising:
providing a host system with a virtual storage area across the logical storage areas controlled by the plurality of nodes respectively, managing allocation of a plurality of virtual partial areas obtained by dividing the virtual storage area and a plurality of partial logical storage areas obtained by dividing the logical storage areas, and distributing data written to the virtual storage area and storing the data in the logical storage areas;
judging whether the same data as first data, which is written to a first virtual partial area managed by a first node from among the plurality of virtual partial areas, exists in a second virtual partial area managed by a second node among the plurality of nodes from among the plurality of virtual partial areas;
executing inter-node deduplication, when the same data as the first data exists in the second node, either for changing allocation of the partial logical storage area for the first virtual partial area to the partial logical storage area for the second virtual partial area or for changing allocation of partial logical storage area for the second virtual partial area of the second node to which the same data is written to the partial logical storage area for the first virtual partial area; and
executing the inter-node deduplication of a third virtual partial area managed by the first node from among the plurality of virtual partial areas obtained by dividing the virtual storage area when a predicted value of I/O load on the first node after execution of the inter-node deduplication of the first virtual partial area is calculated and the predicted value satisfies a predetermined condition.

9. The control method for the distributed storage system according to claim 8,
wherein the I/O load is at least one of inter-node reading network load, average response time, and average throughput; and
wherein the predetermined condition is satisfied when the inter-node reading network load is less than a first threshold, when the average response time is less than a second threshold, or when the average throughput is more than a third threshold.

10. The control method for the distributed storage system according to claim 8,
wherein the inter-node deduplication is executed on data stored in the first node sequentially from data in a virtual partial area with low I/O frequency.

11. The control method for the distributed storage system according to claim 8,
wherein, when the same data exists between the virtual partial areas managed by the first node from among the plurality of virtual partial areas, node deduplication is executed for aggregating allocations of the partial logical storage areas to the virtual partial areas into one of the partial logical storage areas and then the inter-node deduplication is executed.

12. The control method for the distributed storage system according to claim 8,
wherein, when a total sum of a deduplicated number of the first data stored in the first node and a deduplicated number of second data stored in the second node is less than a second threshold, the inter-node deduplication of the first data and the second data is executed.

13. A distributed storage system including a first node connected to one or more nodes for controlling storage of data in a plurality of logical storage areas, the first node and the one or more nodes constituting the distributed storage system,
wherein the first node: provides a host system with a virtual storage area across the logical storage areas controlled by the one or more nodes and the logical storage areas controlled by the first node; manages allocation of a plurality of virtual partial areas obtained by dividing the virtual storage area and a plurality of partial logical storage areas obtained by dividing the logical storage areas; and distributes data written to the virtual storage area with the one or more nodes and stores the data in the logical storage areas;
wherein the first node judges whether the same data as first data, which is written to a first virtual partial area managed by the first node from among the plurality of virtual partial areas, exists in a second virtual partial area managed by a second node among the plurality of nodes from among the plurality of virtual partial areas;
wherein when the same data as the first data exists in the second node, the first node executes inter-node deduplication for changing allocation of the partial logical storage area for the first virtual partial area to the partial logical storage area for the second virtual partial area or for changing allocation of the partial logical storage area for the second virtual partial area of the second node to which the same data is written to the partial logical storage area for the first virtual partial area; and
wherein, when the first node calculates a predicted value of I/O load on the first node after execution of the inter-node deduplication of the first virtual partial area and the predicted value satisfies a predetermined condition, the first node executes the inter-node deduplication of a third virtual partial area managed by the first node from among the plurality of virtual partial areas obtained by dividing the virtual storage area.

* * * * *